United States Patent
Santarelli et al.

(10) Patent No.: US 10,462,608 B1
(45) Date of Patent: Oct. 29, 2019

(54) ESTIMATING ORIENTATION OF A MOBILE DEVICE WITH RESPECT TO A VEHICLE USING GLOBAL DISPLACEMENT INFORMATION AND LOCAL MOTION INFORMATION

(71) Applicant: Agero, Inc., Medford, MA (US)

(72) Inventors: Keith Santarelli, Wakefield, MA (US); Michael Bell, Salem, MA (US)

(73) Assignee: Agero, Inc., Medford, MA (US)

( * ) Notice: Subject to any disclaimer, the term of this patent is extended or adjusted under 35 U.S.C. 154(b) by 0 days.

(21) Appl. No.: 16/041,535

(22) Filed: Jul. 20, 2018

Related U.S. Application Data

(60) Provisional application No. 62/539,482, filed on Jul. 31, 2017.

(51) Int. Cl.
    *H04W 24/00* (2009.01)
    *H04W 4/02* (2018.01)
    *H04W 4/029* (2018.01)

(52) U.S. Cl.
    CPC ........... *H04W 4/026* (2013.01); *H04W 4/027* (2013.01); *H04W 4/029* (2018.02)

(58) Field of Classification Search
    CPC ....... H04W 4/024; H04W 4/02; H04W 4/029; H04W 64/00
    See application file for complete search history.

(56) References Cited

U.S. PATENT DOCUMENTS

| | | |
|---|---|---|
| 4,626,849 A | 12/1986 | Sims |
| 6,975,959 B2 | 12/2005 | Dietrich et al. |
| 7,289,906 B2 | 10/2007 | van der Merwe et al. |
| 8,059,489 B1 | 11/2011 | Lee et al. |
| 8,351,773 B2 | 1/2013 | Nasiri et al. |
| 8,694,251 B2 | 4/2014 | Janardhanan et al. |
| 8,712,803 B1 | 4/2014 | Buentello |
| 8,909,415 B1 | 12/2014 | Hawley |
| 8,929,853 B2 | 1/2015 | Butler |
| 8,989,952 B2 | 3/2015 | Simon |
| 9,020,776 B2 | 4/2015 | Friend |
| 9,127,947 B2 | 9/2015 | Minor et al. |
| 9,253,603 B1 | 2/2016 | Dong et al. |
| 9,308,902 B1 | 4/2016 | Noffsinger |
| 9,414,221 B1 | 8/2016 | Simon et al. |

(Continued)

FOREIGN PATENT DOCUMENTS

CN 106052685 A 10/2016

*Primary Examiner* — Shantell L Heiber
(74) *Attorney, Agent, or Firm* — Wolf, Greenfield & Sacks, P.C.

(57) ABSTRACT

A system for determining an orientation of a mobile device with respect to a vehicle. The system comprises at least one computer processor programmed to: receive local motion information regarding the mobile device; receive global displacement information regarding the mobile device; and based on the local motion information regarding the mobile device and the global displacement information regarding the mobile device, determine the orientation of the mobile device with respect to the vehicle. A method for determining an orientation of a mobile device with respect to a vehicle, and at least one computer-readable storage medium having instructions recorded thereon which, when executed by a computer, cause the computer to perform the method.

17 Claims, 23 Drawing Sheets

(56) References Cited

U.S. PATENT DOCUMENTS

| | | |
|---|---|---|
| 9,576,322 B1 | 2/2017 | Christensen |
| 9,616,849 B1 | 4/2017 | Tucker et al. |
| 9,683,865 B2 | 6/2017 | Keal et al. |
| 9,700,240 B2 | 7/2017 | Letchner et al. |
| 9,786,154 B1 | 10/2017 | Potter et al. |
| 9,817,404 B1 | 11/2017 | Loo et al. |
| 9,863,392 B1 | 1/2018 | Tucker et al. |
| 9,867,035 B2 | 1/2018 | Simon et al. |
| 9,888,392 B1* | 2/2018 | Snyder ............... H04W 4/027 |
| 9,994,218 B2 | 6/2018 | Pal et al. |
| 10,062,285 B2 | 8/2018 | Simon |
| 10,189,425 B2 | 1/2019 | Bell |
| 2003/0233261 A1 | 12/2003 | Kawahara et al. |
| 2005/0030224 A1 | 2/2005 | Koch |
| 2005/0134440 A1 | 6/2005 | Breed |
| 2005/0251328 A1 | 11/2005 | Merwe et al. |
| 2005/0256763 A1 | 11/2005 | Bohonnon |
| 2007/0043496 A1 | 2/2007 | Ogawa |
| 2010/0305806 A1 | 12/2010 | Hawley |
| 2010/0324776 A1* | 12/2010 | Maire ............... B60T 8/1705 701/31.4 |
| 2011/0112969 A1 | 5/2011 | Zaid et al. |
| 2011/0159836 A1 | 6/2011 | Ueoka et al. |
| 2011/0175755 A1 | 7/2011 | Yoshioka et al. |
| 2012/0164989 A1 | 6/2012 | Xiao et al. |
| 2013/0069802 A1 | 3/2013 | Foghel et al. |
| 2013/0081442 A1 | 4/2013 | Basir et al. |
| 2013/0110450 A1 | 5/2013 | Kulik |
| 2013/0165178 A1 | 6/2013 | Lee |
| 2013/0218505 A1 | 8/2013 | Bhandari et al. |
| 2013/0238670 A1 | 9/2013 | Amirpour et al. |
| 2013/0275078 A1 | 10/2013 | Tanabe et al. |
| 2014/0012531 A1 | 1/2014 | Bhandari et al. |
| 2014/0044307 A1 | 2/2014 | Kenagy et al. |
| 2014/0066000 A1 | 3/2014 | Butler |
| 2014/0077972 A1 | 3/2014 | Rathi et al. |
| 2014/0149145 A1 | 5/2014 | Peng et al. |
| 2014/0167973 A1 | 6/2014 | Letchner et al. |
| 2014/0180615 A1 | 6/2014 | Simon |
| 2014/0278206 A1 | 9/2014 | Girod et al. |
| 2015/0097703 A1 | 4/2015 | Baur |
| 2015/0112543 A1 | 4/2015 | Binion et al. |
| 2015/0112733 A1 | 4/2015 | Baker et al. |
| 2015/0120336 A1* | 4/2015 | Grokop ............... B60W 40/09 705/4 |
| 2015/0154711 A1 | 6/2015 | Christopulos et al. |
| 2015/0198625 A1 | 7/2015 | Ghose et al. |
| 2015/0304370 A1 | 10/2015 | Maytal |
| 2015/0324924 A1 | 11/2015 | Wilson et al. |
| 2015/0369836 A1 | 12/2015 | Cordova et al. |
| 2015/0371541 A1 | 12/2015 | Korman |
| 2016/0059855 A1 | 3/2016 | Rebhan et al. |
| 2016/0071334 A1 | 3/2016 | Johnson et al. |
| 2016/0098864 A1 | 4/2016 | Nawrocki |
| 2016/0101319 A1 | 4/2016 | Tanabe et al. |
| 2016/0163029 A1 | 6/2016 | Gibbon et al. |
| 2016/0205238 A1* | 7/2016 | Abramson ......... G01C 21/3484 455/456.4 |
| 2017/0053461 A1 | 2/2017 | Pal et al. |
| 2017/0105098 A1* | 4/2017 | Cordova ............... H04L 43/16 |
| 2017/0109828 A1 | 4/2017 | Pierce et al. |
| 2017/0134885 A1 | 5/2017 | Lortz et al. |
| 2017/0161820 A1 | 6/2017 | Friedman et al. |
| 2017/0221283 A1 | 8/2017 | Pal et al. |
| 2017/0265783 A1 | 9/2017 | Letchner et al. |
| 2018/0213351 A1* | 7/2018 | Gusikhin ............... G01S 1/70 |
| 2018/0319354 A1 | 11/2018 | Bell |

* cited by examiner

ESTIMATING ORIENTATION OF A MOBILE DEVICE WITH RESPECT TO A VEHICLE USING GLOBAL DISPLACEMENT INFORMATION AND LOCAL MOTION INFORMATION

RELATED APPLICATIONS

This application claims priority under 35 U.S.C. § 119(e) to U.S. Provisional Patent Application Ser. No. 62/539,482, entitled "USING INFORMATION FROM A MOBILE PHONE TO DETECT WHEN AN AUTOMOBILE CRASH OCCURS," filed Jul. 31, 2017, the entirety of which is incorporated herein by reference.

BACKGROUND

Conventionally, estimates of the orientation of a mobile device with respect to a vehicle rely on information from inertial sensors of the device, such as an accelerometer. For example, some conventional techniques for estimating the orientation of a mobile device use output from the accelerometer of the device during a period of time when the device is believed to be traveling in a straight line.

SUMMARY

Some embodiments of the invention are directed to a system for determining an orientation of a mobile device with respect to a vehicle in which the mobile device is transported. The system comprises at least one computer processor, programmed to: receive local motion information regarding the mobile device; receive global displacement information regarding the mobile device; and based on the local motion information regarding the mobile device and the global displacement information regarding the mobile device, determine the orientation of the mobile device with respect to the vehicle. In some embodiments, the at least one computer processor may be programmed to, based at least in part on the determined orientation of the mobile device with respect to the vehicle, (1) identify a path traveled by the mobile device with respect to the vehicle as the mobile device is transported by a user outside the vehicle, such as to determine whether the user of the mobile device is a driver of the vehicle; (2) determine whether a driver of the vehicle initiated one or more evasive maneuvers before an impact sustained by the vehicle; and/or (3) determine a direction and/or an area of an impact sustained by the vehicle.

Some other embodiments of the invention are directed to at least one computer-readable storage medium having instructions recorded thereon which, when executed by a computer, cause the computer to perform a method for determining an orientation of a mobile device with respect to a vehicle, comprising: receiving local motion information regarding the mobile device; receiving global displacement information regarding the mobile device; and based on the local motion information regarding the mobile device and the global displacement information regarding the mobile device, determining the orientation of the mobile device with respect to the vehicle.

Still other embodiments are directed to a method for determining an orientation of a mobile device with respect to a vehicle. The method may comprise: receiving local motion information regarding the mobile device; receiving global displacement information regarding the mobile device; and based on the local motion information regarding the mobile device and the global displacement information regarding the mobile device, determining the orientation of the mobile device with respect to the vehicle.

The foregoing is a non-limiting summary of some aspects of certain embodiments of the invention. Some embodiments of the invention are described in further detail in the sections that follow.

BRIEF DESCRIPTION OF DRAWINGS

Various aspects and embodiments are described below with reference to the following figures. It should be appreciated that the figures are not necessarily drawn to scale. Items appearing in multiple figures are indicated by like reference numerals in each figure in which the items appear.

DETAILED DESCRIPTION

I. Overview

The Assignee has appreciated that conventional techniques for estimating the orientation of a mobile device with respect to a vehicle have produced unreliable and inaccurate results due to various limitations. One limitation is that these conventional techniques use only linear acceleration events (e.g., those in which the motion of the vehicle is in a straight line) or events in which motion is assumed to be linear. Using this straight-line assumption reduces the accuracy of orientation estimations for events that are deemed to be "close enough" to straight-line events. Furthermore, using this straight-line assumption restricts the events that can be used for the estimation.

The Assignee has also appreciated that this and other obstacles to reliable and accurate orientation estimation described further below may be mitigated or overcome by using additional information beyond merely that which is produced by inertial sensors (e.g., a gyroscope and/or accelerometer, etc.) of a mobile device (e.g., a smartphone, tablet, wearable device, gaming console, dedicated hardware, and/or any other suitable electronic device(s)). Indeed, the Assignee has appreciated that using such additional information as a basis for estimating the orientation of the mobile device with respect to a vehicle may significantly improve the reliability and accuracy of orientation estimation. For example, global displacement information, such as information produced by a global positioning system (GPS) unit, and/or other data from which the displacement of the mobile device relative to the planet or a surrounding area or some other external environment (e.g., speed, heading, and/or multiple positions determined by the system) may be inferred may be especially useful in improving the reliability and accuracy of orientation estimation.

Figure 1:
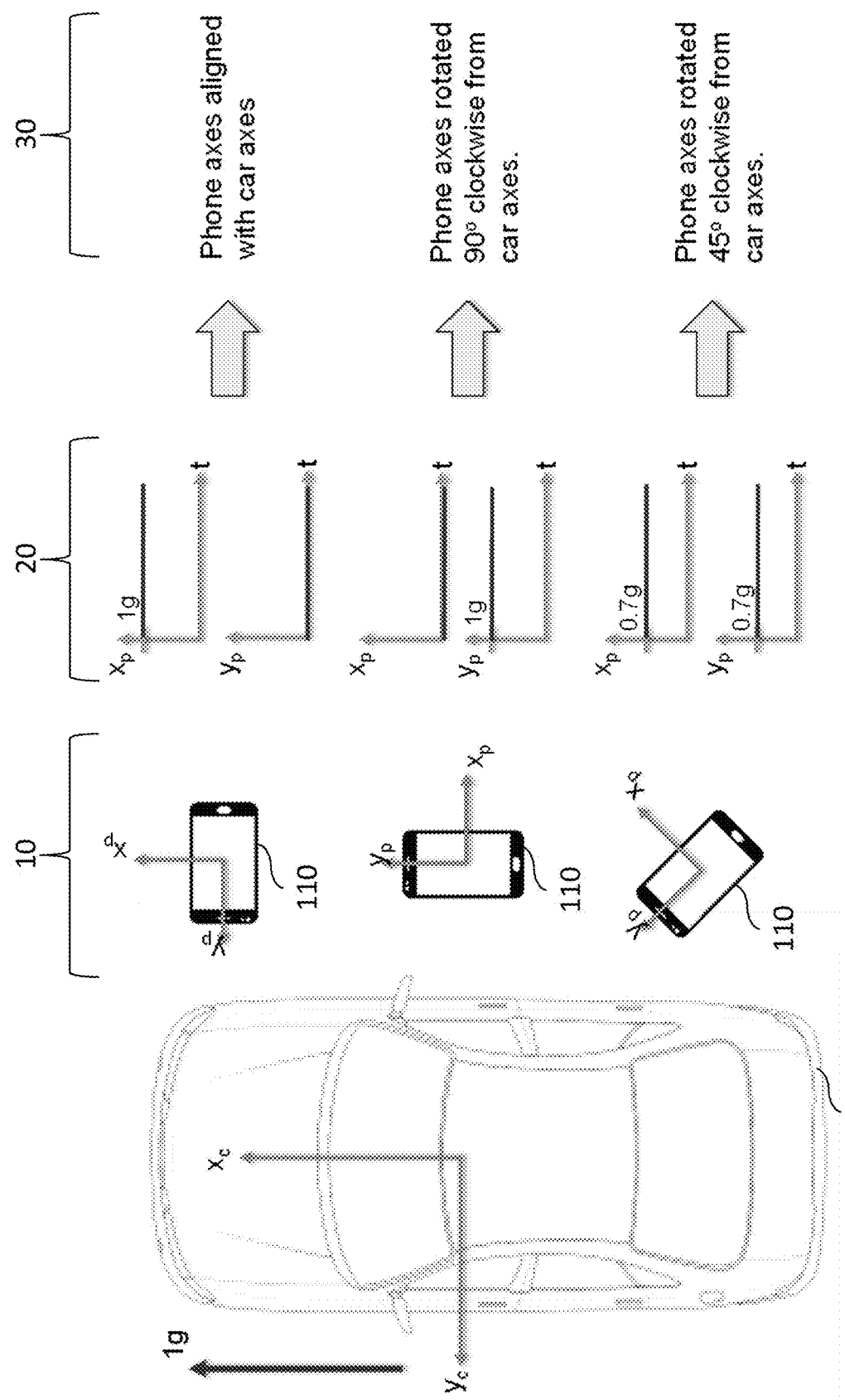
FIG. 1 depicts representations of a vehicle and a mobile device with relative orientations, in accordance with some embodiments.

The Assignee has further appreciated that determining the orientation of a mobile device with respect to a vehicle may allow other information to be gleaned regarding the mobile device, the vehicle, the driver, and so on. As one example, determining the orientation of the device with respect to the vehicle may allow for determining information about acceleration of the vehicle, such as based upon rotational relationships like those shown in FIG. 1. FIG. 1 symbolically depicts vehicle 101 and mobile device 110 with relative orientations 10, with corresponding accelerations along (arbitrarily defined) x- and y-axes 20, and corresponding explanations 30. As shown in FIG. 1, at top in 10 is a mobile device 110 that has an x-axis $x_p$ aligned with the vehicle 101 x-axis $x_c$, such that forward acceleration of the vehicle 101 is detected as positive acceleration along $x_p$ at top of 20 in FIG. 1, as top of 30 explains. At middle in 10 is a mobile device 110 that has its y-axis $y_p$ aligned with the vehicle 101 x-axis $x_c$, such that forward acceleration of the vehicle 101 is detected as positive acceleration along $y_p$ at middle of 20 in FIG. 1, as middle of 30 explains. At bottom in 10 is a mobile device 110 that has its y-axis $y_p$ at a 45 degree angle with the vehicle 101 x-axis $x_c$, such that forward acceleration of the vehicle 101 is detected as equally positive acceleration along both $y_p$ and $x_p$ at bottom of 20 in FIG. 1, as indicated at bottom of 30. As will be described in further detail below, some embodiments of determining the orientation of the device with respect to the vehicle may provide insights into (as examples) impacts sustained by the vehicle (e.g., the initial direction of a crash, such as that a crash originated at the front right bumper or the rear of the vehicle), whether evasive maneuvers were initiated at a given time (e.g., before an impact), whether hard braking or acceleration occurred, and/or whether information reported about an incident involving the vehicle is accurate.

As another example, determining the orientation of the device with respect to the vehicle may allow for determining whether the user of the device is the driver of the vehicle. For example, the orientation of the mobile device with respect to the vehicle may enable determination of the location in the vehicle from which the mobile device was removed. For example, if the mobile device exits on the left side of the vehicle, this may indicate (in certain jurisdictions) that the user of the device is the driver of the vehicle, and if the mobile device exits on the right side of the vehicle, this may indicate that the user of the device is a passenger. Knowing whether the user of the device is the driver of the vehicle may be useful for any of numerous reasons, such as to inform decisions relating to usage-based insurance (UBI) (i.e., insurance premised on direct measurements of a user's driving ability and behavior). In this respect, the Assignee has appreciated that one challenge associated with using a mobile device to inform decisions relating to UBI is that a mobile device captures data for all trips in which the device is transported in a vehicle, and not just those trips during which the user of the device is the driver. Of course, it should be appreciated that an estimate of the orientation of a device with respect to a vehicle may have uses unrelated to insurance.

These and other features and advantages of some embodiments are described in detail below.

II. Estimating the Orientation of a Device with Respect to a Vehicle

The Assignee has appreciated that conventional device orientation estimation techniques have suffered from poor reliability and accuracy due in part to directional ambiguity. That is, when only local motion information like acceleration is measured, there are two possibilities for orientation: the calculated orientation, and an orientation that is 180 degrees rotated from the calculated orientation. An illustration of this phenomenon is given in FIG. 2. In the example shown, a +1 g force acts along the y-axis of a mobile device depicted in FIG. 2, and a 0 g force acts on the other axes. This could correspond to a 1 g acceleration (i.e., speed-up) event in the forward direction of the vehicle with the y-axis of the mobile device pointing toward the front of the vehicle, as shown at bottom left of FIG. 2, or this could correspond to a −1 g acceleration (i.e., braking) event with the mobile device's y-axis pointing toward the rear of the vehicle, as shown at bottom right of FIG. 2.

The Assignee has also appreciated that noise and corruption, non-uniform force directions, non-constant acceleration, and small forces relative to gravity may contribute to the poor reliability and accuracy of conventional orientation estimation techniques. In this respect, while high-frequency noise may be mitigated via lowpass filtering, low-frequency vibrations may persist, and force in non-uniform directions like significant lateral forces (e.g., a turning vehicle) or vertical forces (e.g., a vehicle hitting a bump or going up and down a hill) may create a disparity between a force vector direction and the forward direction of a vehicle, which may cause calculated rotations to be incorrect. Additionally, measured force may be quite variable over intervals of braking or acceleration (such as shown at top in FIG. 2), and may be corrupted by noise. Moreover, the forces that are measured are typically small in magnitude compared to 1 g, such that addressing the role of gravity may be important in generating an accurate measure of force during a given event (e.g., an impact or acceleration). To illustrate, although an event with constant vehicle acceleration is depicted at top in FIG. 2, insufficient remediation of the role gravity plays in conventional techniques makes the graph appear to depict the vehicle slowing down and then speeding up.

Figure 2:
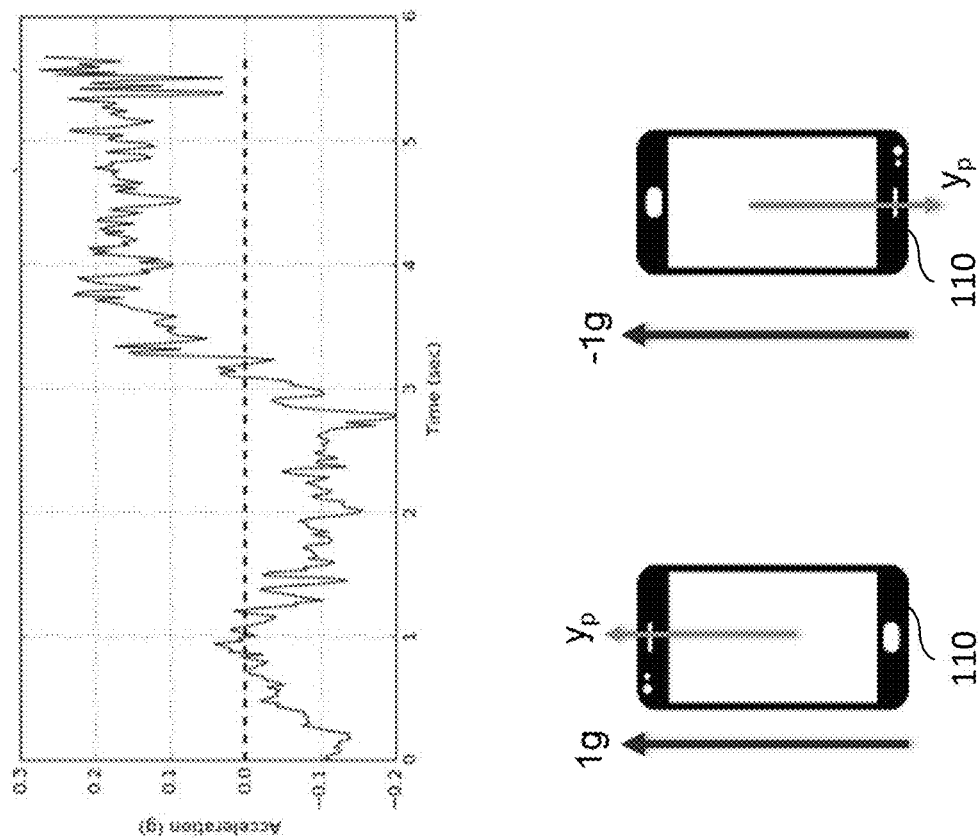
FIG. 2 depicts representations of acceleration of a mobile device, in accordance with some embodiments.
Figure 3:
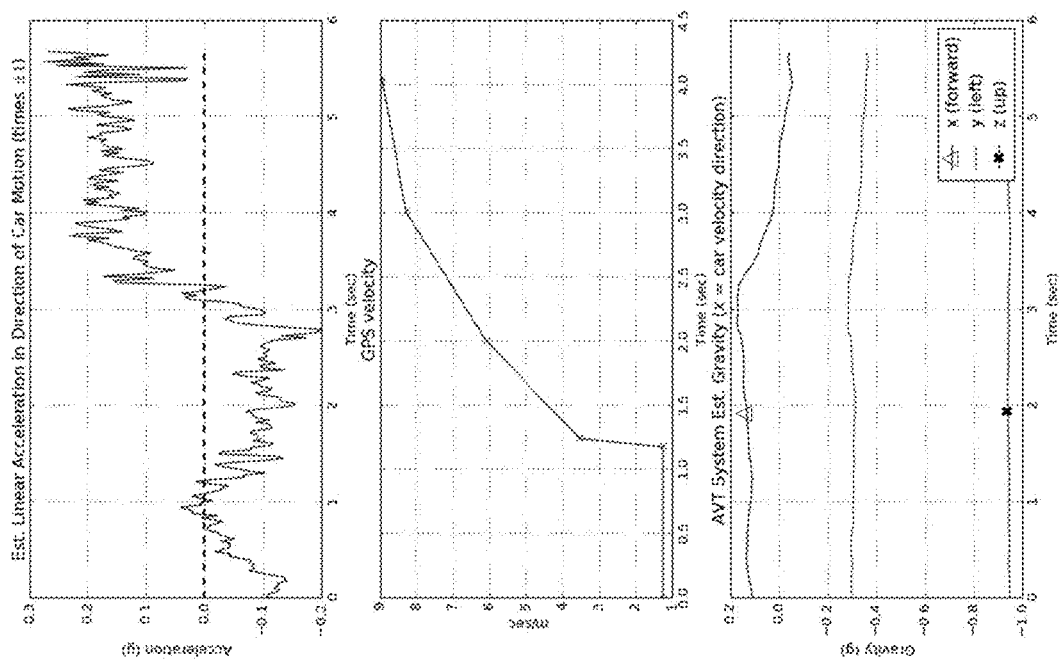
FIGS. 3-5 depict representations of acceleration, velocity, and gravity, in accordance with some embodiments.

FIG. 3 includes at top the same acceleration graph that is shown at the top of FIG. 2, with corresponding GPS-inferred speed at middle, and estimated gravity at bottom. In FIG. 3, gravity is estimated given the time series within the time window of the event by calculating the mean or median of the gravity vector within the time window.

Figure 4:
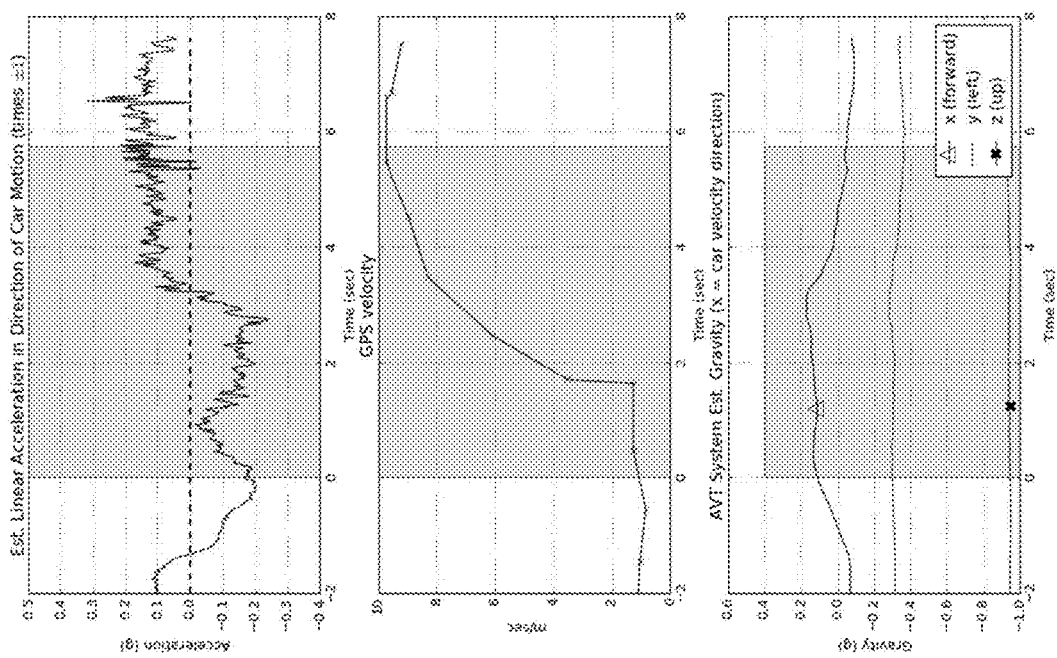

FIG. 4 includes graphs of acceleration, GPS-inferred speed, and estimated gravity for the same event represented in the graphs shown in FIG. 3, but with an expanded time window for the event. FIG. 4 illustrates a phenomenon recognized by the Assignee: that when a time window is expanded, even slightly, a "quiet" period may appear at the edges (i.e., before and after the time window represented in FIG. 3. The Assignee has also appreciated that the gravity vector (shown at bottom in FIG. 4) may be determined more easily and accurately during such a "quiet" period (e.g., at left of bottom of FIG. 4) than during a "less quiet" period like any of the time window represented at bottom of FIG. 3, as gravity may be more easily distinguished from less powerful forces at work in a "quiet" period. The Assignee has further appreciated that removing an estimate of gravity produced using this estimate of the gravity vector (e.g., shown at bottom in FIG. 4) from raw acceleration may produce an acceleration profile like that which is shown at top in FIG. 5, which is more consistent with the GPS-inferred velocity profile than would have been produced using conventional techniques.

Figure 5:
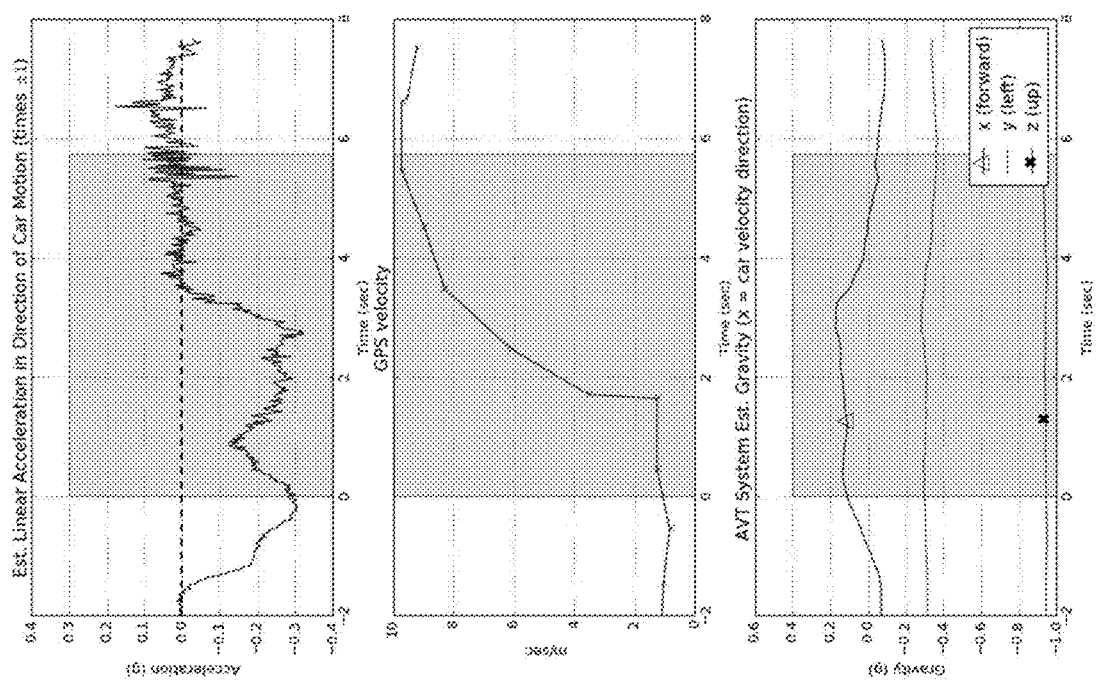
Figure 6:
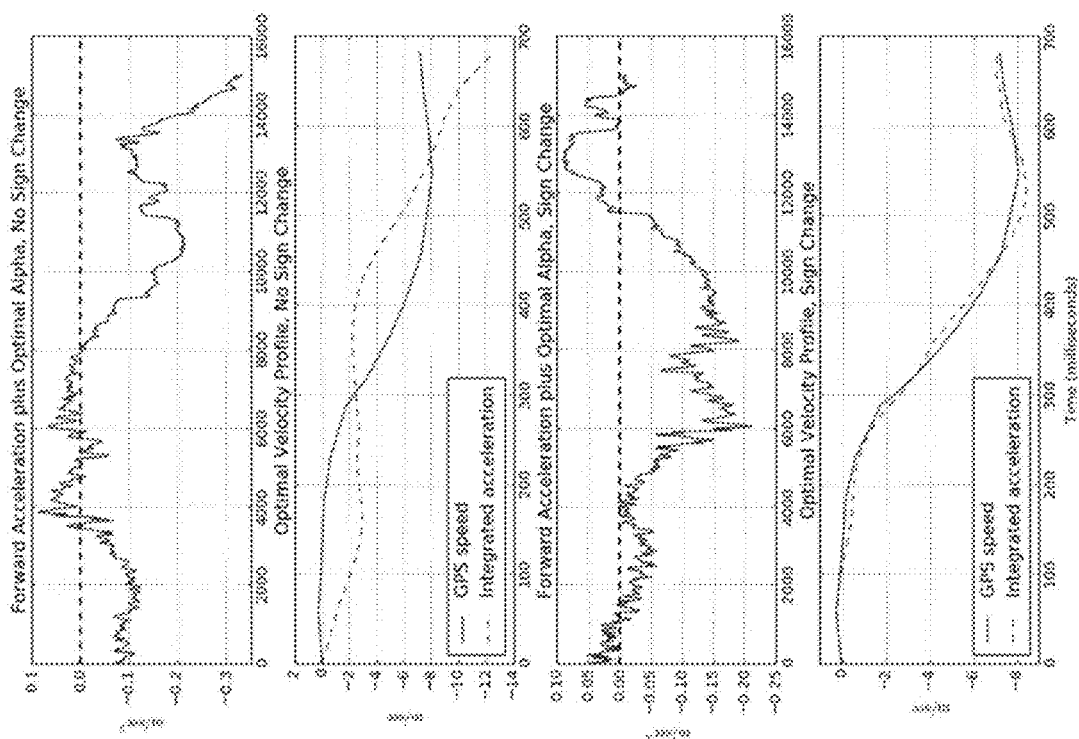
FIG. 6 depicts representations of acceleration and speed, in accordance with some embodiments.

The Assignee has also appreciated that the examples shown in FIGS. 3, 4, and 5 may be atypical because in these, a quiet period occurs just before an acceleration or similar event, whereas this may not be the case when a vehicle is moving, due to all the forces at work. FIG. 6 shows another example of acceleration and GPS-inferred speed profiles for a mobile device in a moving vehicle. An example like that which is represented in FIG. 6 has led the Assignee to appreciate that gravity error may be further reduced by using some embodiments herein to determine a gravity vector, such as is described in relation to act 216 of FIG. 11 below.

Figure 7:
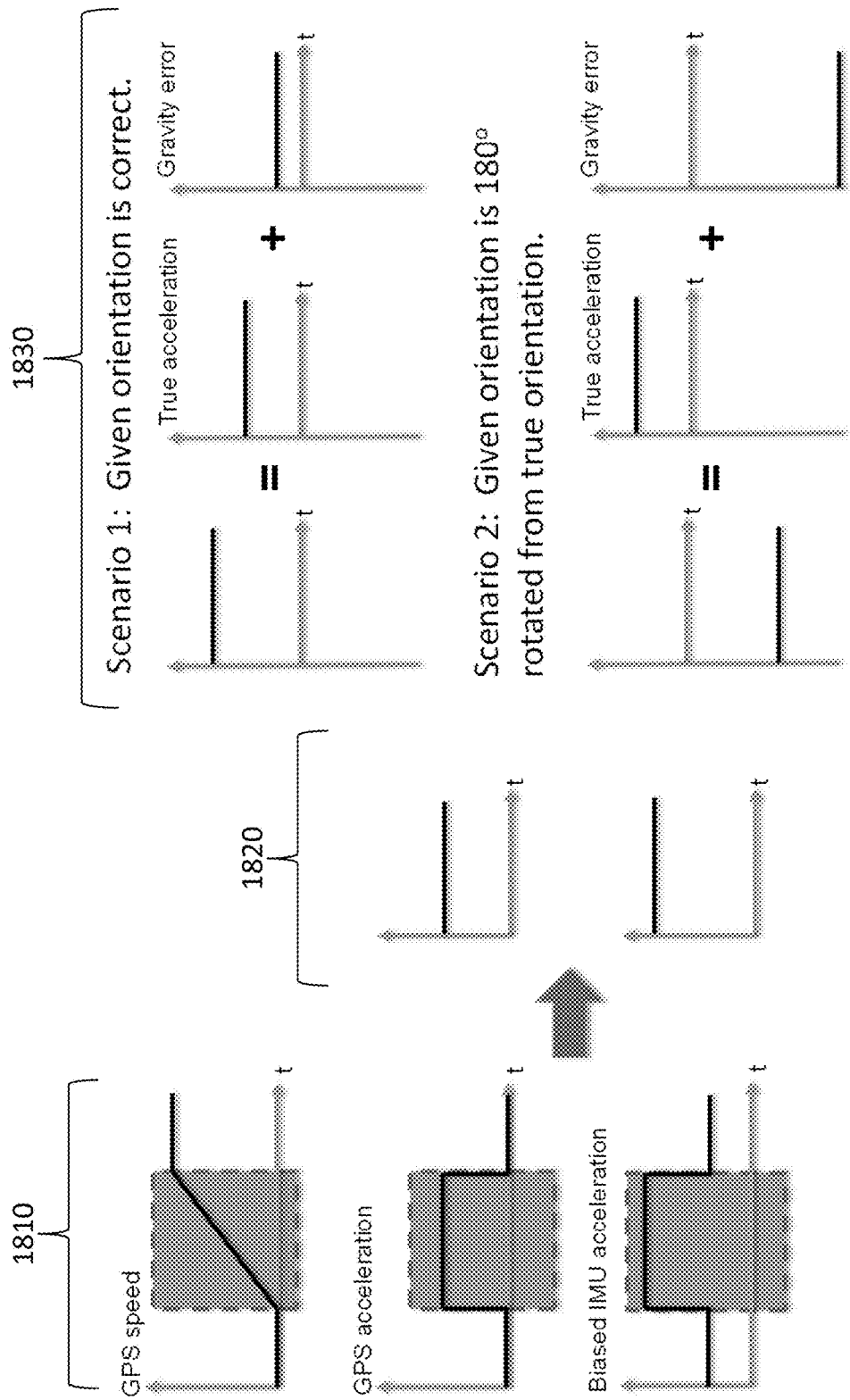
FIG. 7 depicts representations of speed, acceleration, and gravity error in various time windows, in accordance with some embodiments.

The Assignee has further appreciated that increasing the amount of time over which an event is analyzed may improve the reliability and accuracy of orientation determination, as the time window conventionally selected for analysis of a "fast braking" event is generally not long enough for disambiguating orientation. In this respect, FIG. 7 illustrates that it may not be possible to disambiguate orientation when acceleration is constant or near-constant, especially since it may not be possible to determine the "true" acceleration and the gravity error from their measured sum when that sum is constant or near-constant. In FIG. 7, 1810 depicts a time window in which speed is increasing (as indicated at top in 1810) at a constant rate (as indicated at middle and bottom in 1810). However, at 1820 are shown the different accelerations measured by a GPS unit (at top in 1820) and an IMU (at bottom in 1820). At 1830 are shown two plausible conclusions from the information represented in 1810 and 1820: the one at top in which the determined orientation happens to be correct, and another at bottom in which the determined orientation is 180 degrees rotated from the true orientation.

Figure 8:
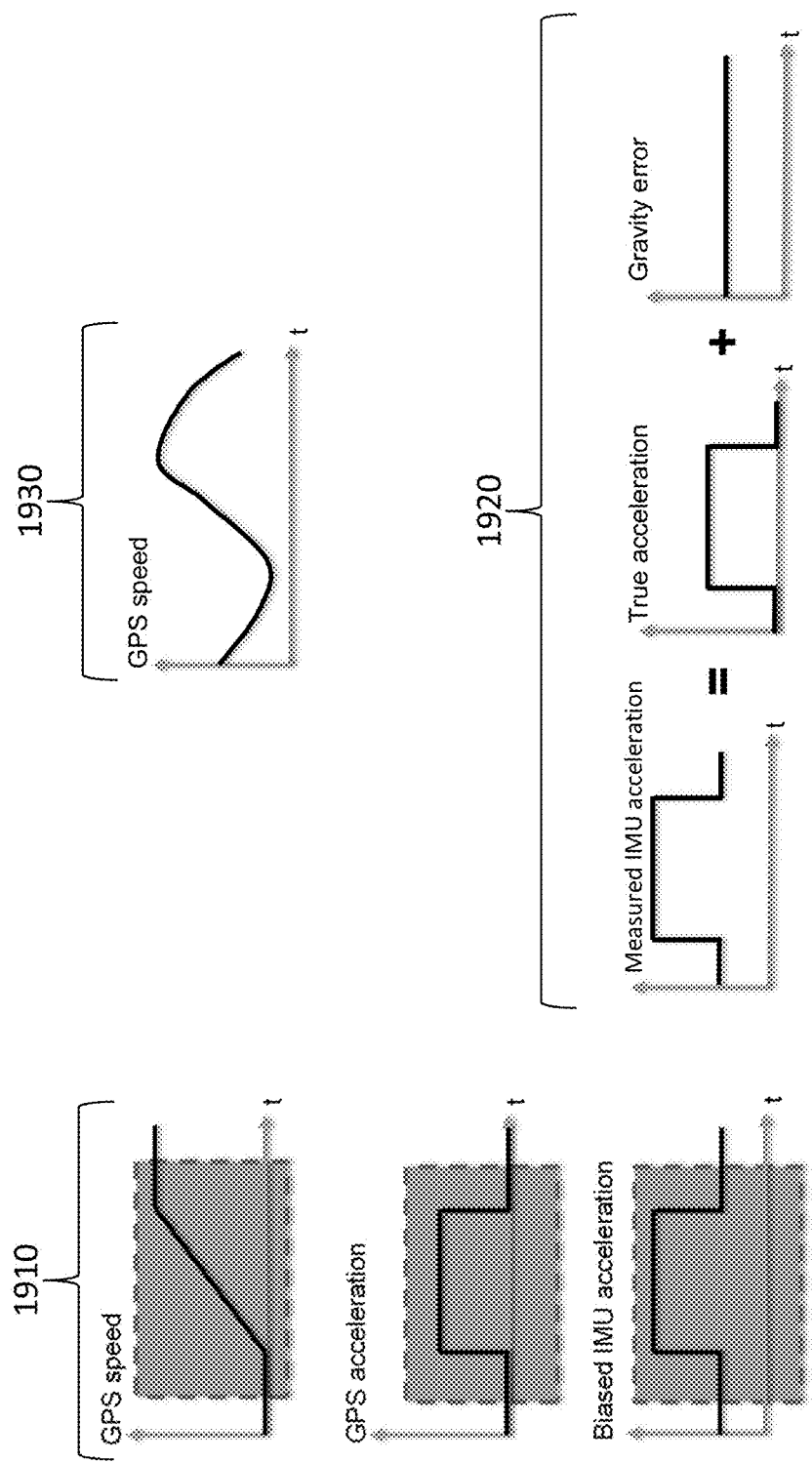
FIG. 8 depicts representations of speed, acceleration, and gravity error in alternative time windows, in accordance with some embodiments.

FIG. 8 illustrates the improved reliability and accuracy that may be achieved in accordance with some embodiments of the invention. At 1910 are shown graphs for GPS-inferred speed (at top), GPS-inferred acceleration (at middle), and IMU-measured acceleration (at bottom) for the same event represented in the graphs at 1810 (FIG. 7), but over a longer time window than is reflected in the graphs shown at 1810. In this example, the window is selected so that speed is not increasing at a constant rate, and acceleration is not constant, over the length of the window. At 1920 is shown the constituents of the (gravity-biased) measured IMU acceleration shown in 1910, and specifically the measured IMU acceleration (at bottom in 1910 and at left of 1920) includes a true acceleration (at middle) and a gravity bias (at right). It can be seen that using the expanded time window represented in 1910 enables a conclusion to be drawn that the orientation reflected at top in 1830 is far more likely to be correct than that which is reflected at bottom in 1830, because a 180 degree rotation would not allow for the profile of constant velocity, then a speed-up, then a constant velocity shown in the expanded time window reflected at 1910. Thus, it can be seen that analyzing an event over a different (e.g., expanded) time window may eliminate or mitigate at least part of the directional ambiguity problem described above.

The Assignee has also appreciated that the "edges" of the time window over which an event is analyzed need not be times at which constant velocity occurred. In fact, the Assignee has recognized that the more variation in a speed profile during a time window, the easier it may be to disambiguate orientation and produce an accurate orientation estimate. For example, 1930 shows an exemplary GPS speed that may provide even more reliable and accurate orientation determination if a time window is set to include it. In this respect, some embodiments of the invention are directed to automatically selecting the length of a time window to improve the reliability and accuracy of an orientation estimate. For example, in accordance with some embodiments, an automated procedure may quantify "sufficient variation" in the velocity profile. For example, such a procedure may employ a motion mask, which is a technique for labeling when a value over a time series is positive, negative, or roughly zero. An exemplary motion mask is as follows:

$$m_t = \begin{cases} 1 & a_t > s \\ 0 & |a_t| \leq s \\ -1 & a_t < -s \end{cases}$$

Figure 9:
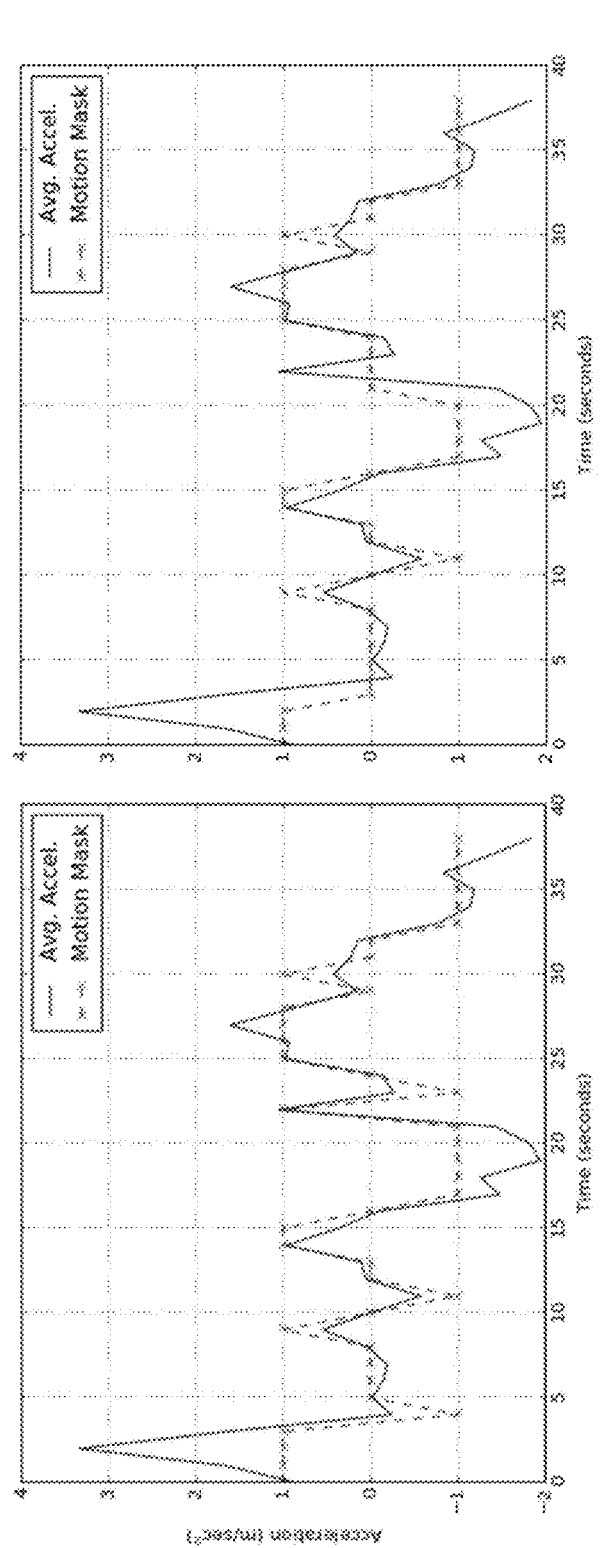
FIG. 9 depicts representations of a motion mask, in accordance with some embodiments.

Here, $a_t$ may be a rough approximation of GPS acceleration (e.g., the first difference of velocity divided by the time difference); $m_t$ may quantify when velocity is increasing (+1), decreasing (−1), or roughly constant (0); and s may be a threshold (such as 0.25 meters per second squared) below which acceleration values are considered to be roughly 0. FIG. 9 shows an example of a motion mask. Some embodiments may include additional logic to filter out high frequency switching between +1 and −1, with results as shown in the average acceleration along with the motion mask in FIG. 9. A motion mask may in some embodiments aid in mitigating situations where the velocity is just starting to transition from increasing to decreasing or vice-versa, which is counted as near-constant velocity.

In some embodiments, for a given window length, two statistics may be computed:

$$v_1 = \frac{1}{N}\sum_{t=1}^{N} |m_t| \text{ and}$$

$$v_2 = \frac{1}{N}\left|\sum_{t=1}^{N} m_t\right|$$

Here, N may be the number of GPS samples in the window length (which typically may be 5-30 samples). $v_1$ represents the fraction of the window where the velocity profile is changing (i.e., increasing or decreasing). For example, $v_1$ may indicate whether there is enough acceleration either way, and $v_2$ may indicate whether there is enough variation. $v_2$ crudely represents the net variation in the velocity profile. If $v_1$ is high, the velocity profile may have significant periods of time where it is increasing, decreasing, or both; if $v_2$ is also low, then there may be a counterbalance. Examples include the following: a velocity profile that has a significant increasing region and a significant constant velocity region; a velocity profile that has a significant decreasing region and a significant constant velocity region; and a velocity profile that has significant increasing and decreasing regions.

For a given window length, some embodiments may employ the following thresholds:

$$v_1 > v_1^{crit}$$

and/or $$v_2 < v_2^{crit}$$

In some embodiments, $v_1^{crit}$ may be between 0.35 and 0.65, such as 0.5. Alternatively or additionally, $v_2^{crit}$ may be between 0.2 and 0.45, such as 0.33.

In accordance with some embodiments, a candidate window length may include a smallest window length corresponding to a fast braking event and a largest window length that includes plus or minus 15 seconds, where the increment between window lengths may be 1 second. For each candidate window length, some embodiments may compute $v_1$ and $v_2$ and apply the thresholds listed above. If a candidate window length satisfies both thresholds, it may be added to a list of valid window lengths. Some embodiments may then solve the corresponding optimization problem, such as that discussed below regarding act 220 of FIG. 11, for each valid window length. Each individual window length may yield its own determination (e.g., an estimate of $\theta_{opt}$). Some embodiments may then employ the orientation determination corresponding to the window length with the lowest result when a quality indicator (e.g., $s_l$ as described with regard to act 240 of FIG. 11 below) is applied. For example, for any of these embodiments, a quality indicator may be used to filter and discard poor estimates, as described below. In some embodiments, orientation estimates may include 95% of estimates with less than 20 degrees of error.

In some embodiments, one or more mathematical models and/or other algorithms may be used to process readings from a mobile device and/or transformed representations thereof to estimate the orientation of the mobile device with respect to a vehicle. The model(s) may, for example, be initially trained using data gathered from any suitable number of mobile devices, over any suitable period of time, and may be updated over time as more and more data (e.g., on more and more mobile devices over time) is gathered and processed. As a result, the accuracy with which the model(s) estimate orientation may increase over time. However, it should be appreciated that embodiments are not limited to using only models trained in this manner. For example, information identified by one model to be useful may be used in the application of one or more other models. Additionally, it should be appreciated that the information that is used in making orientation estimates is not limited to the information produced by one or more models. Any suitable form(s) of information may be used.

The orientation of a mobile device may be estimated at any suitable juncture(s) and by any suitable component(s). For example, in some embodiments, readings collected from the components of a mobile device with respect to a vehicle may be processed by one or more modules executed by a server that is physically remote from the mobile device, at some time after the readings are captured. By contrast, in some embodiments these readings may be processed in real-time by the mobile device itself as data is captured, such as to provide real-time feedback to the user of the device and/or to enable functionality associated with a particular vehicle or type of vehicle provided by the device. Any of numerous different modes of implementation may be employed.

It should be appreciated that, as used herein, the term "estimating", such as in "estimating the orientation", need not necessarily mean estimating the exact orientation, although the actual orientation may be much closer to the orientation estimated than "estimating" typically suggests. For example, in some cases an estimation may consist of a general directional estimate, at a relatively low level of specificity. In other cases, an estimation may be at a high level of specificity, and close to if not identical to the device's actual orientation. It should also be appreciated that, as used herein, the term "determining" may include estimating, calculating, and/or any other suitable methodology for arriving at whatever is being determined.

In some embodiments, the accelerometer, gyroscope, and/or GPS components of a mobile device may provide information that is usable to make determinations herein. For example, in some embodiments, accelerometer readings indicating acceleration of the mobile device in one or more directions (e.g., in x-, y-, and z-directions, and/or in any other suitable direction(s), as defined in any suitable way(s)) over time may be sampled while the mobile device resides in or near the vehicle during its operation. Gyroscope and/or GPS readings may, for example, be used to determine when the vehicle and/or mobile device are being operated in predefined ways that the Assignee has appreciated yield readings that are most useful in making determinations described herein. For example, gyroscope and/or other instrument readings may be used to identify periods during which the mobile device is in (and/or is not in) one of a set of predetermined orientations and/or modes of use. As an example, the Assignee has appreciated that accelerometer readings taken while the mobile device is actively being used may not be reliable for making the orientation determinations described herein, and so accelerometer readings taken during periods of active use (e.g., as indicated by readings from a gyroscope and/or other instruments) may be ignored.

Figure 10:
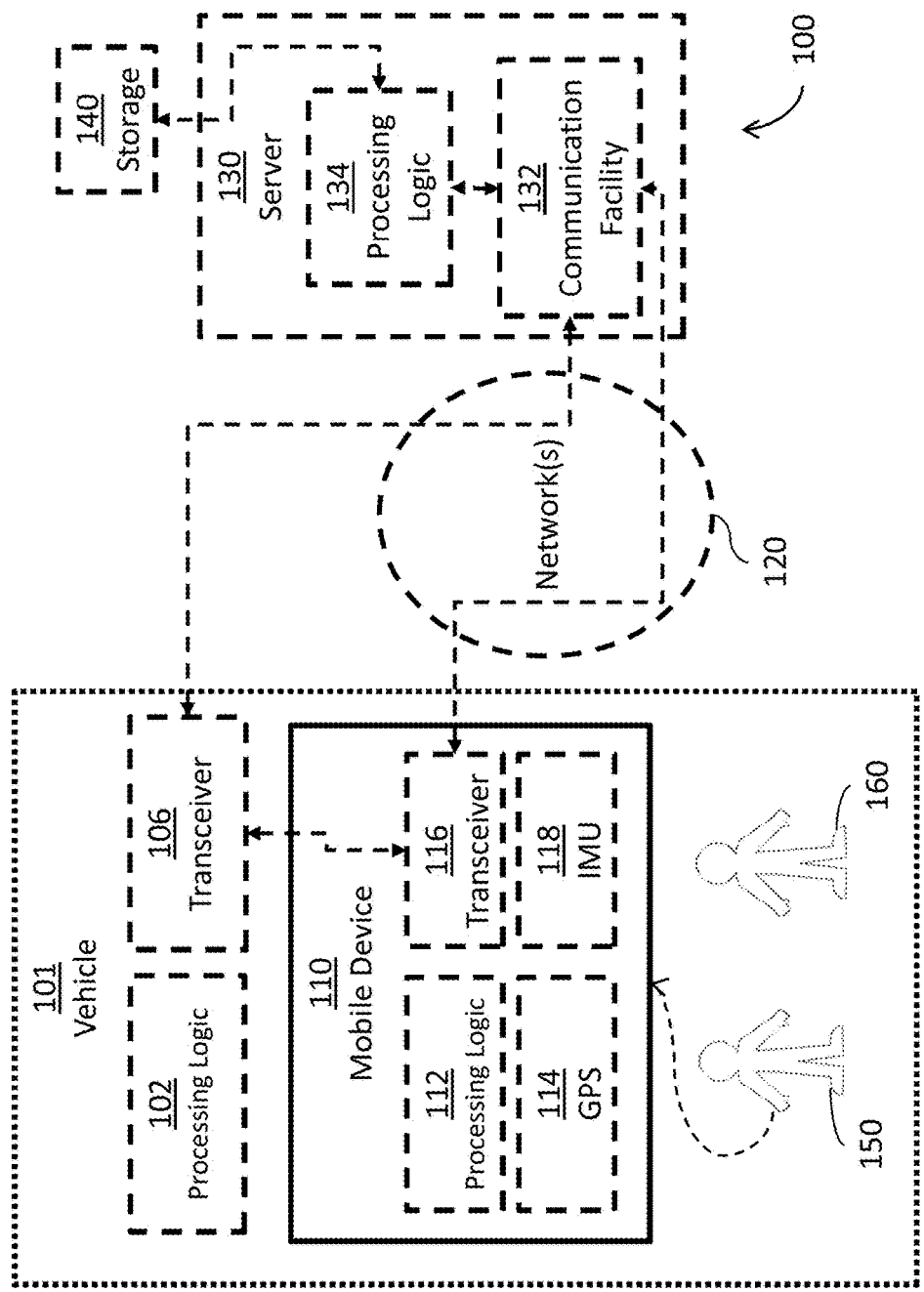
FIG. 10 is a block diagram depicting a representative system for determining the orientation of a mobile device with respect to a vehicle, in accordance with some embodiments.

FIG. 10 depicts a representative system 100 for collecting and processing data from a mobile device and/or one or more other sources to estimate the orientation of a mobile device with respect to a vehicle in which the device travels at least some of the time. In representative system 100, mobile device 110 may travel in and near vehicle 101, but is not permanently associated with vehicle 101, or any other particular vehicle, and may be transported by a user from one vehicle to another. As such, vehicle 101 is represented using dotted lines in FIG. 10. Although a label in the singular is used herein to reference a mobile device, it should be appreciated that the components used to collect data useful for the determinations described herein may be physically and/or logically distributed across any suitable number of hardware devices, each adapted for transport by a user between settings (e.g., vehicles) as the user desires.

Vehicle 101 may be any suitable vehicle, adapted for travel on land, sea, and/or air. For example, vehicle 101 may be an automobile, truck, motorcycle, boat, helicopter, airplane, and/or any other suitable type of vehicle. In some embodiments, vehicle 101 may include processing logic 102 and/or transceiver 106. Transceiver 106 may allow vehicle 101 to communicate with mobile device 110 or via network(s) 120 with server 130. In some embodiments, processing logic 102 may comprise software code that is executed to perform operations such as those performed by processing logic 112 or 134.

In representative system 100, mobile device 110 may comprise inertial measurement unit (IMU) 118, processing logic 112, GPS unit 114, and transceiver 116. IMU 118 may comprise any suitable collection of components for capturing the movement and/or orientation of mobile device 110. For example, in some embodiments, IMU 118 may comprise one or more accelerometers, gyroscopes, and/or any other suitable components. GPS unit 114 captures information relating to the location of mobile device 110 over time, which may be used to infer the speed and/or heading at which mobile device 110 (and, thereby, the vehicle in which it travels) is moving at any given time. It should be appreciated, however, that vehicle location, speed, and/or heading may be measured in any of numerous ways, and that embodiments are not limited to using a GPS unit to measure device location, speed, and/or heading. Any suitable technique(s) and/or component(s) may be employed. GPS unit 114 may be one example of a provider of global displacement information.

IMU 118 and GPS unit 114 may provide data to processing logic 112 for processing or to transceiver 116 (discussed below) for transmission. This processing may take any of numerous forms, and some representative processing modes are described in further detail below. For example, in some embodiments, processing logic 112 may comprise software code that is executed to apply one or more mathematical models to readings captured by IMU 118 and GPS unit 114 so as to estimate the orientation of the mobile device 110 with respect to the vehicle 101.

Mobile device 110 may further include transceiver 116, which allows mobile device 110 to communicate via network(s) 120 with server 130. Network(s) 120 may comprise any suitable communications infrastructure, and employ any suitable communication protocol(s), as embodiments are not limited in this respect. For example, if mobile device 110 comprises a smartphone adapted for cellular communication, then network(s) 120 may comprise one or more cellular networks.

Server 130 may comprise communication facility 132 for receiving transmissions from, and sending transmissions to, mobile device 110 via network(s) 120. Communication facility 132 may take any of numerous forms, which may be driven by the communications infrastructure comprising network(s) 120. For example, if network(s) 120 comprise one or more wired networks, then communication facility 132 may comprise a network adapter useful for receiving transmissions over the wired network(s), and if network(s) 120 comprise one or more wireless networks, then communication facility 132 may comprise a radio useful for receiving transmissions over the wireless network(s). Of course, communication facility may comprise components useful for receiving transmissions over different types of networks.

Server 130 may include processing logic 134. In some embodiments, processing logic 134 may comprise software code that is executable to process information received from mobile device 110 via network(s) 120. As an example, processing logic 134 may be used to process local motion and global displacement information (and/or representations thereof) received from mobile device 110 to estimate the orientation of the mobile device with respect to a vehicle. Processing logic 134 may store information in, and retrieve information from, data repository 140. For example, processing logic 134 may cause local motion and global displacement information and/or representations thereof received from mobile device 110 to be stored in data repository 140. Results generated by processing the information received from mobile device 110 may be stored in data repository 140. Although only one data repository 140 is shown in FIG. 10, it should be appreciated that any suitable number of data repositories may be employed.

Results generated by processing logic 134 may be provided to one or more components (e.g., processing logic 112, or one or more components not shown in FIG. 10), which may generate information for presentation to a user (e.g., to a user of mobile device 110, such as to provide real-time feedback, or to one or more other users not represented in FIG. 10, as described in further detail below). If the information generated by these component(s) is to be provided to a user of electronic device 110, it may be transmitted to mobile device 110 via communication facility 132 and network(s) 120.

It should be appreciated that although the description above includes references to several components of representative system 100 being implemented at least in part via software, any of the components of representative system 100 may be implemented using any suitable combination of hardware and/or software components. As such, each component should be generically considered a controller that may employ any suitable collection of hardware and/or software components to perform the described function.

It should also be appreciated that although only a single server 130 and single mobile device 110 is shown in FIG. 10, any suitable number of server components may be used to process information received from any suitable number of mobile devices. Any information gathered by a mobile device may be processed by components that are logically and/or physically distributed across any suitable number of server devices. In similar fashion, any processing of such information may be logically and/or physically distributed across processing logic 112 on a mobile device 110 and processing logic 134 on a server 130, in any suitable fashion. Any of numerous different modes of implementation may be employed.

Figure 11:
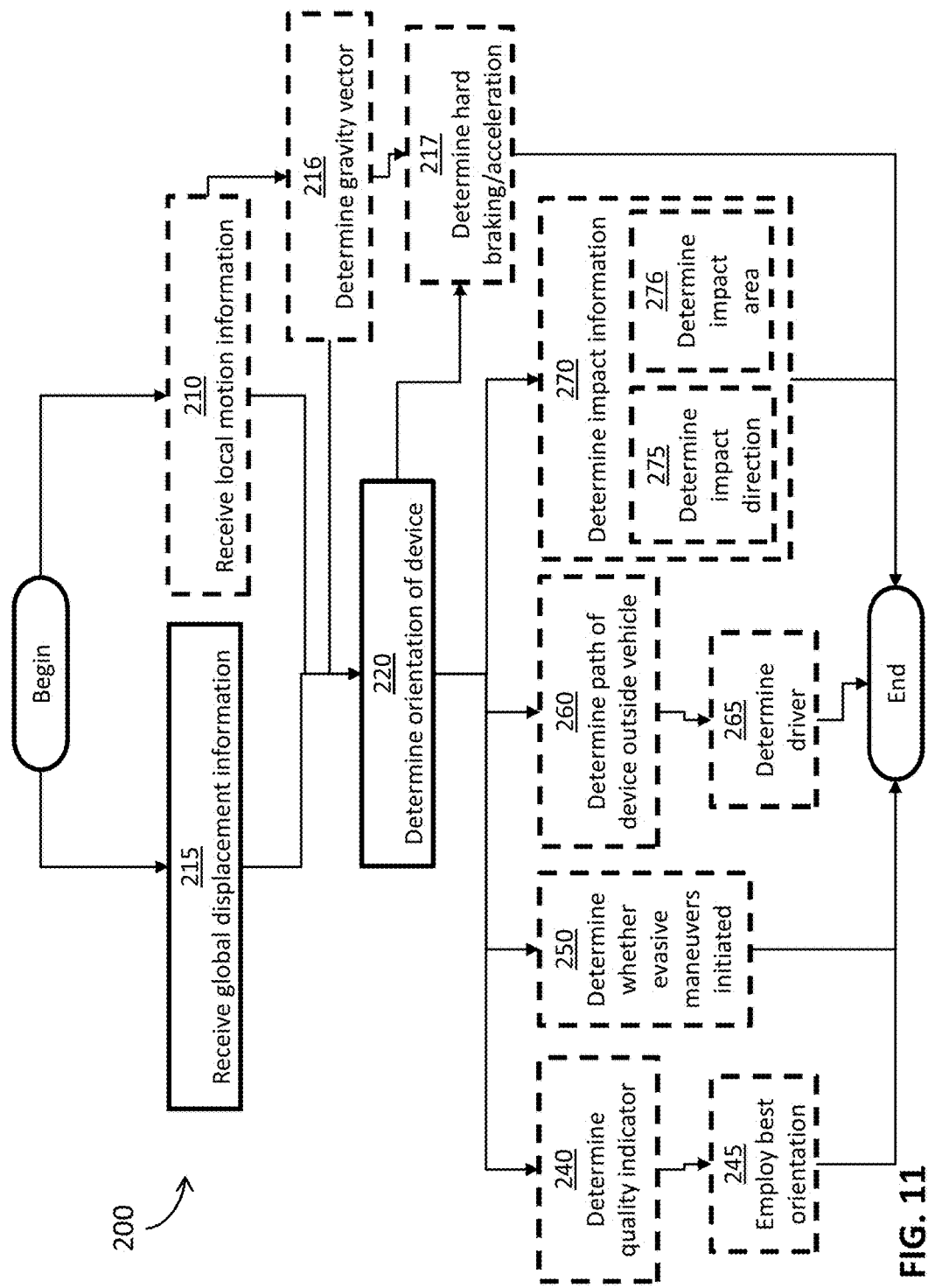
FIG. 11 is a flow chart depicting a representative process for determining the orientation of a mobile device with respect to a vehicle, in addition to other determinations, in accordance with some embodiments.

FIG. 11 depicts a representative high-level process 200 for estimating the orientation of a mobile device (e.g., mobile device 110) with respect to a vehicle (e.g., vehicle 101). Representative process 200 involves the application of one or more mathematical models, and so before the start of representative process 200 (and other representative processes described herein), and/or during and after representative process 200, one or more mathematical models may be trained to estimate the orientation of a mobile device with respect to a vehicle, such as using data captured by one or more mobile devices traveling in or near a vehicle. In some embodiments, local motion information and/or global displacement information may be collected by one or more mobile devices while each device travels in or near one or more vehicles. For example, a GPS unit of each mobile device may capture global displacement information and an accelerometer component may capture local motion information, such as acceleration components in three dimensions, referred to herein as x-, y-, and z-directions for simplicity. Of course, acceleration may be characterized as occurring in any suitable direction(s), which may or may not correspond to x-, y-, and/or z-directions in a Cartesian coordinate system. Embodiments are not limited in this respect.

In some embodiments, for purposes of training the model(s), the collected information may be specifically associated with a particular mobile device, set of mobile devices, and/or mobile device(s) exhibiting certain qualities. For example, one data set captured by a mobile device A may be labeled as relating to mobile device A, another data set captured by mobile device B may be labeled as relating to mobile device B, and/or another data set captured by mobile device C may be labeled as relating to mobile devices having one or more qualities exhibited by mobile device C. Each of mobile device A, B, and C may be a different make and/or model of smartphone, for example, which may have different qualities, such as a specific gyroscope range.

Any suitable type(s) of mathematical model may be trained to perform techniques described herein. For example, a machine learning algorithm (e.g., a neural network) may be trained to use data to learn how to estimate the orientation of a mobile device with respect to a vehicle or any other determination described herein. Of course, a machine learning algorithm need not be used, as any suitable mathematical model(s) and/or computational approach(es) may be employed.

The effectiveness of the model(s) in estimating device orientation may be determined in any suitable fashion. For example, if the model(s) successfully determine the direction of an impact a vehicle has sustained less than a threshold percentage of the time, then it may be determined that the model(s) should be further trained before being used further. Any suitable revision, adjustment, and/or refinement may be applied. For example, more training data may be passed to the model(s) to further train the model(s). Any revision, adjustment, and/or refinement may be applied using manual techniques, automatic techniques, or a combination thereof.

The model(s) may be revised in any of numerous ways. In some embodiments, vehicle operation data may be used to further train the model(s), such as to identify particular features in received information that are useful for estimating the orientation of a mobile device with respect to a vehicle.

In some embodiments, representative process 200 optionally may begin at act 210, wherein local motion information regarding the mobile device may be received by at least one processor. In some embodiments, the processor(s) may be located at a server, such as processing logic 134 of server 130 described above. Alternatively or additionally, the processor(s) may be located on the mobile device itself (e.g., using processing logic 112) or even on the vehicle itself (e.g., using processing logic 102). In some embodiments, the local motion information may be received from an IMU (e.g., IMU 118 of mobile device 110) or any other suitable source.

Before, during, or after act 210, act 215 may occur, wherein global displacement information regarding the mobile device may be received by the processor(s). In some embodiments, the global displacement information may be received from a GPS unit (e.g., GPS 114 of mobile device 110) or any other suitable source. In some embodiments, global displacement information includes at least one speed of the mobile device, at least one heading of the mobile device, and/or at least two positions determined by a global positioning system component (e.g., GPS 114) of the mobile device. For example, the global displacement information may be a scalar speed of the mobile device, a velocity with both speed and heading or direction, and/or positions. In some embodiments, global displacement information may include at least one speed of the vehicle determined by at least one sensor of the vehicle, such as a speedometer or a built-in GPS unit.

According to some embodiments, the global displacement information and/or the local motion information regarding the mobile device may indicate non-linear acceleration of the mobile device. The Assignee has appreciated that using acceleration that is non-linear (e.g., including curves such as periods of time when the vehicle with the mobile device inside is turning) may greatly increase the reliability and accuracy of the estimation of the orientation of a mobile device with respect to a vehicle. This is in part because including non-linear acceleration provides more information, as well as longer window lengths (as discussed above), that may be used for orientation estimation.

Some embodiments may consider acceleration in both forward and left directions (or their opposites). Some embodiments may determine forward acceleration from a speed profile determined from global displacement information such as a GPS speed profile. Additionally, some embodiments may determine left acceleration from a course angle indicating the direction of the mobile device or vehicle in the North-West frame, which may also be available from GPS data and/or another source (e.g., a gyroscope). A time derivative of this quantity may then be used to estimate angular velocity with respect to time, and from there, centripetal acceleration may be determined. In some embodiments, the centripetal acceleration may be used to determine the left acceleration. The Assignee has appreciated that using centripetal acceleration may reduce error in estimating orientation from approximately 60 degrees to approximately 20 degrees or less.

Representative process 200 may then optionally proceed to act 216, wherein a gravity vector may be determined. In some embodiments, the gravity vector may be estimated based on the local motion information and optionally the global displacement information received as described above. The gravity vector may include any suitable number of dimensions, including those in the forward direction, the left direction, and/or the up direction and their opposites. In some embodiments, estimates (e.g., small corrections) of gravity in forward and/or left directions may be used to estimate gravity (e.g., small corrections) in the up direction.

The Assignee has appreciated that while an orientation estimate may rely on a coarse estimate of the direction of gravity, a more accurate determination of the gravity vector as made possible by some embodiments may improve the reliability and accuracy of both the orientation estimation and other determinations described herein. For example, situations where accurate measurements of the non-gravity component of an accelerometer measurement are important include classifying overly-aggressive braking and/or acceleration events, as described further below. The Assignee has appreciated that the correction to the gravity vector that may be computed by some embodiments can change the non-gravity acceleration estimates by 33-50%, which allows significantly reduced false positives and false negatives in classifying such overly-aggressive braking and/or acceleration events.

In some embodiments, gravity error in the forward direction may be modeled as a bias $\alpha$ on measured forward acceleration a, such as in the following equation, where $a_{true}$ is actual forward acceleration:

$$a(t) = a_{true}(t) + \alpha.$$

Additionally, gravity error in the leftward direction may be modeled as a bias $\beta$, such as in the following equation:

$$\beta = -\sin\theta \tilde{f}_1 + \cos\theta \tilde{f}_2.$$

Here, $\theta$ is the angular orientation to be determined, while $\tilde{f}_1$ and $\tilde{f}_2$ are means of raw accelerations in directions perpendicular to gravity in an artificial reference frame not corresponding to the reference frame of the vehicle.

The Assignee has appreciated that gravity error in the upward direction may be determined based on the gravity errors in the forward and leftward directions. For example, in the frame of reference of the vehicle, upward gravity error may be modeled as $\delta$ as follows in some embodiments:

$$\delta = 1 - \sqrt{1 - \alpha^2 - \beta^2}$$

In some embodiments, the gravity error in the frame of reference of the mobile device may be determined using a rotation operation, which may then be used to determine the downward direction in the vehicle's frame of reference.

According to some embodiments, the combined gravity error $\epsilon_{opt}$ may be expressed as follows, where C is defined in the discussion of act 220 below, $\theta_{opt}$ is the orientation to be determined, $\upsilon_{GPS}$ is the velocity of the mobile device or vehicle estimated based on global displacement information (such as GPS data), and $\upsilon_{IMU}$ is the velocity of the mobile device or vehicle estimated based on local motion information (such as data from an IMU):

$$\epsilon_{opt} = \frac{\int_0^{t_0} t(\upsilon_{GPS}(t) - C(\theta_{opt})\upsilon_{IMU}(t))dt}{\int_0^{t_0} t^2 dt}.$$

In some embodiments, $\upsilon_{GPS}$ may be determined as follows (while $\upsilon_{IMU}$ may be determined from, for example, integration of data from an IMU unit):

$$\upsilon_{GPS}(t) \triangleq \begin{bmatrix} s(t) \\ \int_0^t \omega(\tau)s(\tau)d\tau \end{bmatrix}.$$

Here, s is a speed profile determined from global displacement information such as a GPS speed profile, r is a given time interval, and $\omega$ is the angular velocity of the mobile device or vehicle, which may be determined from a time derivative of the course angle indicating the direction of the mobile device or vehicle in the North-West frame, which may also be available from GPS data and/or another source.

Representative process 200 may then proceed to act 220, wherein based on the global displacement information and optionally the local motion information regarding the mobile device, the orientation of the mobile device with respect to the vehicle may be determined by the processor(s) in use. In some embodiments, part of this determination may include act 216. Alternatively, this determination in act 220 may be based on the gravity vector determined in act 216. For example, act 216's determination of the gravity vector may be an integral part of determining the orientation in act 220, or the orientation may be determined in act 220 based on an already determined gravity vector from act 216. Alternatively or additionally, the orientation of the mobile device with respect to the vehicle may be determined using forward and left acceleration inferred from global displacement information like GPS data and using one or more local motion information acceleration readings, such as IMU data.

According to some embodiments, the orientation to be determined may be expressed as $\theta_{opt}$ as follows:

$$\theta_{opt} = \arctan 2(B, C)$$

A (used below), B, and C are defined as follows:

$$A = \int_0^{t_0} \|\tilde{\upsilon}_{GPS}(t)\|^2 dt + \int_0^{t_0} \|\tilde{\upsilon}_{IMU}(t)\|^2 dt$$

$$B = \int_0^{t_0} \tilde{\upsilon}_{GPS}(t)' \tilde{\upsilon}_{IMU}(t) dt$$

$$C = \int_0^{t_0} \tilde{\upsilon}_{GPS}(t)' \begin{bmatrix} 0 & 1 \\ -1 & 0 \end{bmatrix} \tilde{\upsilon}_{IMU}(t) dt$$

Here, $\tilde{\upsilon}_{GPS}$ is the difference between the velocity of the mobile device based on global displacement information (such as GPS data) and the weighted mean of the velocity of the mobile device or vehicle estimated based on global displacement information, while $\tilde{\upsilon}_{IMU}$ is the difference between the velocity of the mobile device based on local motion information (such as data from an IMU) and the weighted mean of the velocity of the mobile device or vehicle estimated based on local motion information. $\tilde{\upsilon}_{GPS}$ and $\tilde{\upsilon}_{IMU}$ may be expressed as follows:

$$\tilde{\upsilon}_{GPS}(t) = \upsilon_{GPS}(t) - \frac{\int_0^{t_0} t\upsilon_{GPS}(t)dt}{\int_0^{t_0} t^2 dt} t, \quad \tilde{\upsilon}_{IMU}(t) = \upsilon_{IMU}(t) - \frac{\int_0^{t_0} t\upsilon_{IMU}(t)dt}{\int_0^{t_0} t^2 dt} t.$$

The Assignee has appreciated that this expression of the orientation may include a single optimization problem without the 180 degree ambiguity discussed above.

The Assignee has appreciated that, while using global displacement information enables more reliable and accurate orientation estimates to be produced, its use may require various difficulties to be overcome. For example, global displacement information like GPS data typically has a low sampling rate (e.g., one sample per second), especially compared to that of typical local motion information. Furthermore, global displacement information may be difficult to synchronize with local motion information like acceleration due to each having different time axes. For example, global motion information may be delayed relative to local motion information due to various factors, such as reliance on an external system for GPS, and so on. The Assignee has appreciated that alignment of the axes and/or filtering of some data from either source may be necessary for the data to be usable together effectively. Additionally, global displacement information typically does not include sufficient dimensions and general similarity to conventionally used local motion information for such synchronization to be straight-forward.

According to some embodiments, act 220 may include synchronization of the global displacement information and the local motion information, such as alignment of the respective time axes of the global displacement information and the local motion information. This synchronization may include detection of time intervals in each that suggest the intervals correspond to the same actual time interval, as discussed in more detail below with relation to FIGS. 15-17.

In some embodiments, the orientation determination may be utilized to determine information about the vehicle, driver, and so on, as discussed above. For example, a rotation matrix or similar mathematical construct like a quaternion may be used to derive an orientation of the vehicle or other information from measured or estimated acceleration or any other suitable information.

In some embodiments, accelerometer and gyroscope information may be sampled at high frequency from a user's mobile device during a drive, along with location and heading measured using GPS (which may be sampled at different frequencies). According to some embodiments, a set of existing algorithms may be used in post-processing (or live) to detect periods of high acceleration (i.e., fast speed-up or slow-down). In some embodiments, an acceleration vector in the reference frame of the mobile device during these high acceleration periods may be directly measured from the accelerometer, and an acceleration vector in the reference frame of the car may be computed via the GPS data, utilizing information about the mobile device's speed and its change in heading. The Assignee has appreciated that a mathematical optimization technique may determine a rotation matrix that rotates the acceleration vector measured in the frame of the mobile device into the acceleration vector computed in the frame of the car. This rotation matrix may be the estimate of the mobile device's orientation in the frame of the car.

Representative process 200 may then optionally proceed to act 217, wherein a determination may be made by the processor(s) regarding whether an acceleration of the mobile device indicates braking or accelerating that exceeds a threshold (e.g., because "hard" braking or acceleration of the vehicle has occurred). The braking or acceleration may be due to any suitable reason, such as reckless driving, an impact, a near-miss, and so on. In some embodiments, the determination of act 217 may be based directly on the determination of the gravity vector in act 216. Alternatively, the determination of act 217 may be based indirectly on the determination of the gravity vector in act 216, and based directly on the determination of the orientation in act 220.

Representative process 200 may then optionally proceed to any of a number of other acts to make additional determinations, including any of acts 240, 250, 260, and/or 270. For example, if process 200 proceeds from act 220 to act 240, at least one quality indicator indicating a degree of reliability of the determined orientation of the mobile device with respect to the vehicle may be determined by the processor(s). The Assignee has appreciated that some embodiments may produce a quality indicator that, based on the information measured and received, provides an estimate of how "pure" or "corrupt" a given orientation determination is likely to be. This quality indicator has become possible due to refined optimization, resulting in a quality indicator that more closely correlates with estimation error than was previously possible.

In some embodiments, act 220 may include act 240. For example, act 240's determination of the quality indicator and/or act 245's use of the quality indicator may be integral part of determining the orientation in act 220, or the quality indicator may be determined and/or used based on the orientation determined in act 220.

In some embodiments, the quality indicator may have the following definition, where A, B, and C are defined in the discussion of act 220 above:

$$s_l \triangleq \frac{2\sqrt{B^2 + C^2}}{A},$$

$0 \leq s_l \leq 1$.

In some embodiments, when $s_l=1$, optimal cost is zero, and the data may fit the model perfectly. When $s_l=0$, the least-squares cost function described above may be a constant, and optimization contains no information about orientation. In general, values closer to 1 may indicate good data fits and orientation estimates, whereas values closer to zero may indicate bad fits and estimates.

In some embodiments, when the quality indicator lies below a given threshold, the resulting orientation determination is deemed untrustworthy and can be ignored. Alternatively or additionally, when the quality indicator lies above a given threshold, which may be a different threshold, the resulting orientation determination may be deemed reliable, very reliable, and so on.

Representative process 200 may then optionally proceed from act 240 to act 245, in which the processor(s) may employ the best orientation as the orientation to use. For example, if two orientations have been determined in two different time windows or even in the same time window (e.g., using different information), the determined orientation corresponding with the most positive quality indicator may be employed as the orientation and/or for further determinations.

Alternatively or additionally, process 200 may proceed from act 220 to act 250, wherein the processor(s) may, based on the determined orientation of the mobile device with respect to the vehicle, determine whether a driver of the vehicle initiated one or more evasive maneuvers. In some embodiments, the evasive maneuvers may have been made before an impact the vehicle sustained or in any other suitable time or situation.

Figure 12:
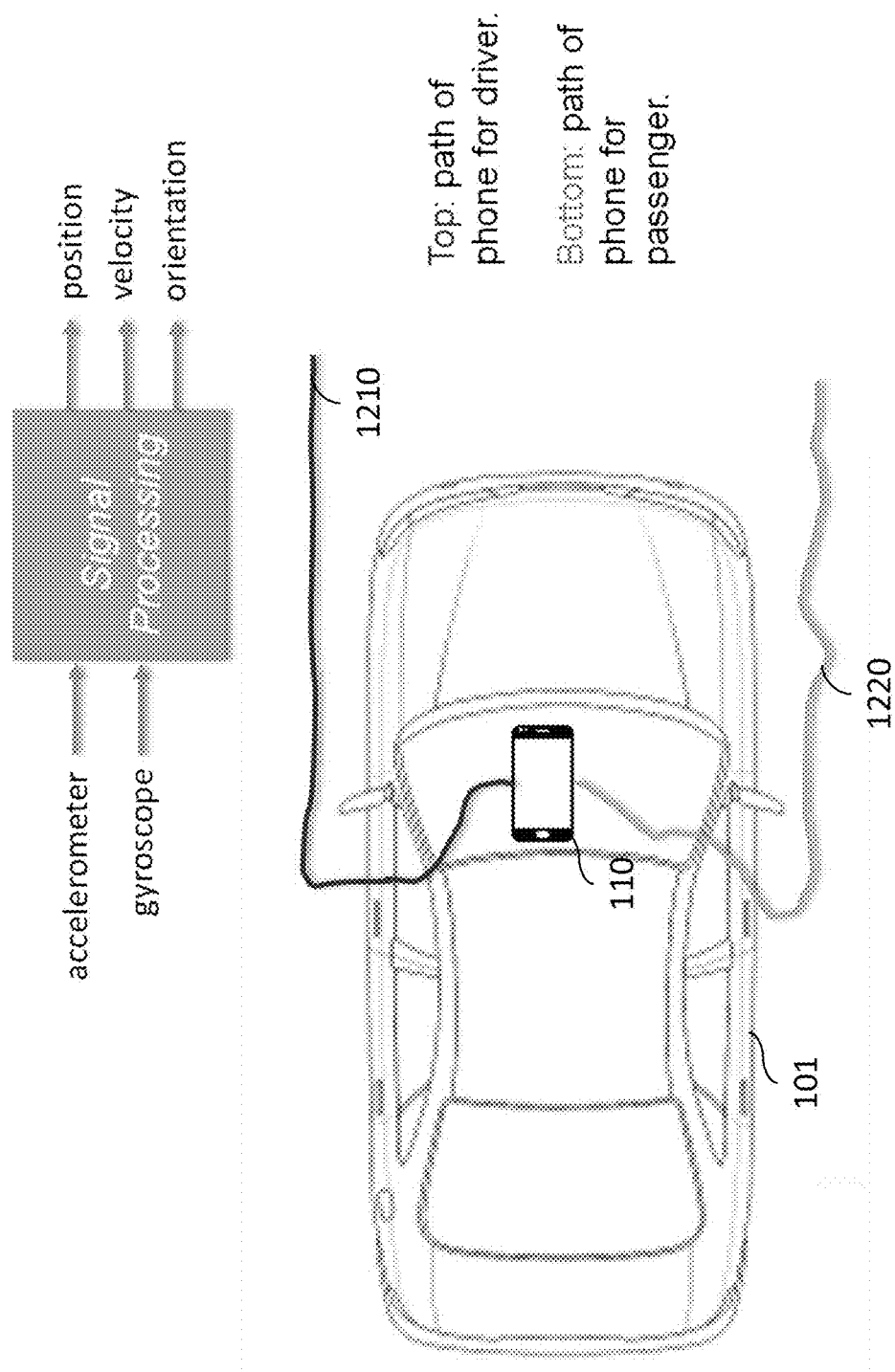
FIG. 12 depicts representations of paths traveled by a mobile device transported by a user outside a vehicle, in accordance with some embodiments.

Alternatively or additionally, process 200 may proceed from act 220 to act 260, wherein the processor(s) may, based at least in part on the determined orientation of the mobile device with respect to the vehicle, determine a path traveled by the mobile device with respect to the vehicle as the mobile device is transported by a user outside the vehicle. For example, FIG. 12 illustrates two exemplary paths a mobile device 110 might travel: along the left side of the vehicle 101 from a driver seat 1210, which may indicate that the device's 110 owner is the driver, and along the right side of the vehicle 101 from a passenger seat 1220, which may indicate that the device's 110 owner is a passenger.

Process 200 may then proceed from act 260 to act 265, in which the processor(s) may, based on the determined path traveled by the mobile device with respect to the vehicle as the mobile device is transported by the user outside the vehicle, determine whether the user of the mobile device is a driver of the vehicle. For example, in the two exemplary paths 1210, 1220 of FIG. 12, a path on the left side (e.g., 1210) of the vehicle 101 may indicate that the device's 110 owner is the driver, and a path on the right side (e.g., 1220) of the vehicle 101 may indicate that the device's 110 owner is a passenger.

Figure 13:
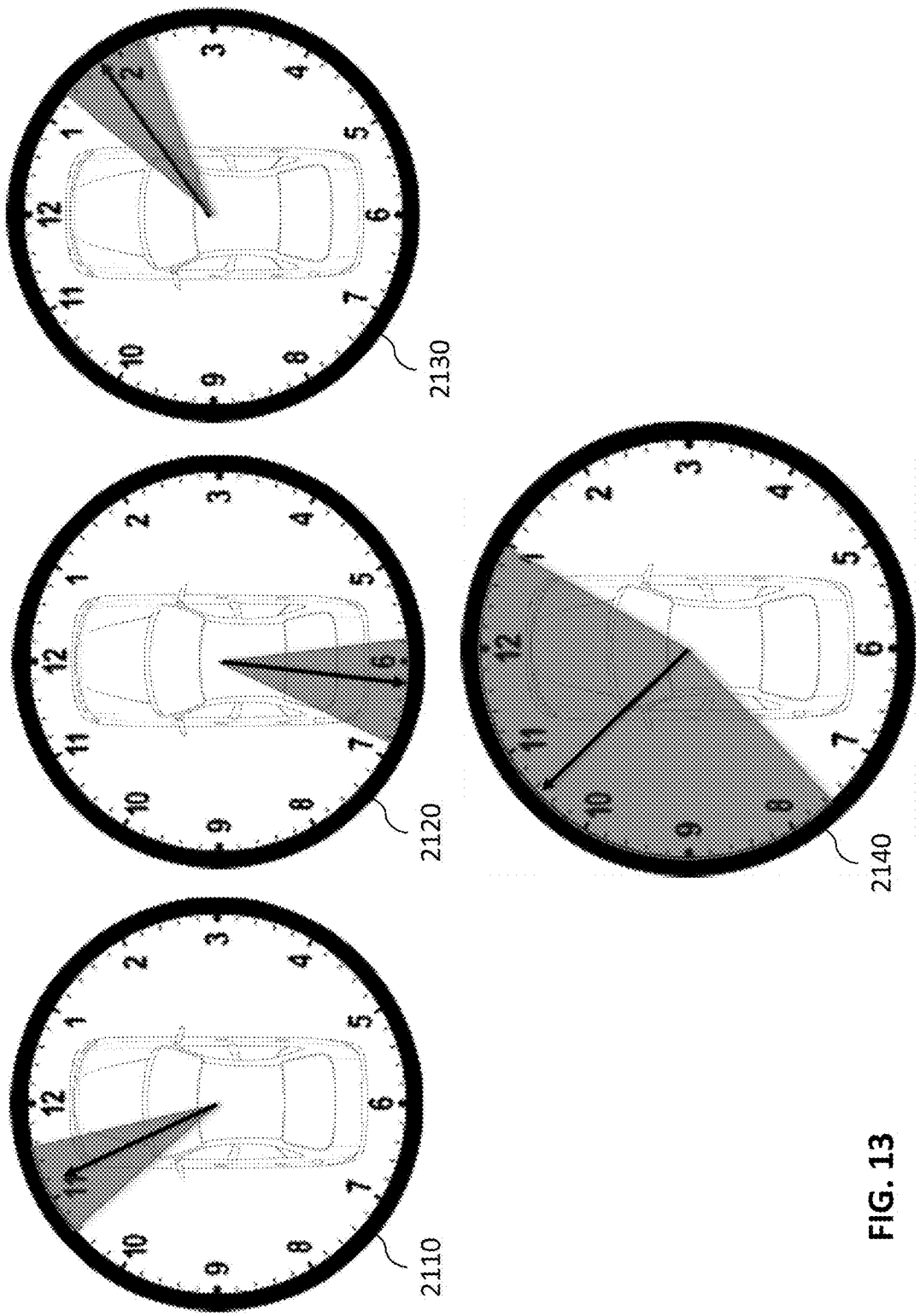
FIG. 13 depicts representations of exemplary determined impact directions, in accordance with some embodiments.

Alternatively or additionally, process 200 may proceed from act 220 to act 270, wherein the processor(s) may determine information regarding an impact the vehicle has sustained. In some embodiments, act 270 may include act 275, wherein the information being determined comprises a direction of the impact. Alternatively or additionally, act 270 may include act 276, wherein the information being determined comprises an area of the impact, such as the main components of the vehicle that sustained the impact. In some embodiments, the area of the impact may be determined based on a determined direction of the impact. For example, the processor(s) may access a model of the vehicle and determine what components of the vehicle would likely have sustained the impact and to what extent based on the direction of the impact and the measured acceleration at or near the time of the impact. FIG. 13 shows examples of directions of impacts in 2110, 2120, and 2130, with the integrated forward/left acceleration mapped onto a clock. The shaded areas around the arrows indicate uncertainty. The Assignee has appreciated that lateral direction can be determined from a relative proportion of forces in the forward and left directions. The Assignee has also recognized that, because forces vary wildly during initial impact, some embodiments cannot merely consider a ratio of accelerations at a single point in time. Rather, some embodiments may compute the area under the forward and left acceleration curves during an impact event and use these areas to compute an angular estimate of the initial impact. Also in FIG. 13, 2140 shows a lower quality determination of the impact direction, which may occur when only a lower quality orientation estimate is available. For example, the quality indicator for this orientation determination may be about 0.67, and the direction determination may be about 90 degrees away from the actual impact direction.

In some embodiments, process 200 may then end or repeat as necessary. For example, any or all of process 200 may use iterative processing to improve the accuracy of the determinations being made. Any suitable number of iterations may be used.

Figure 14:
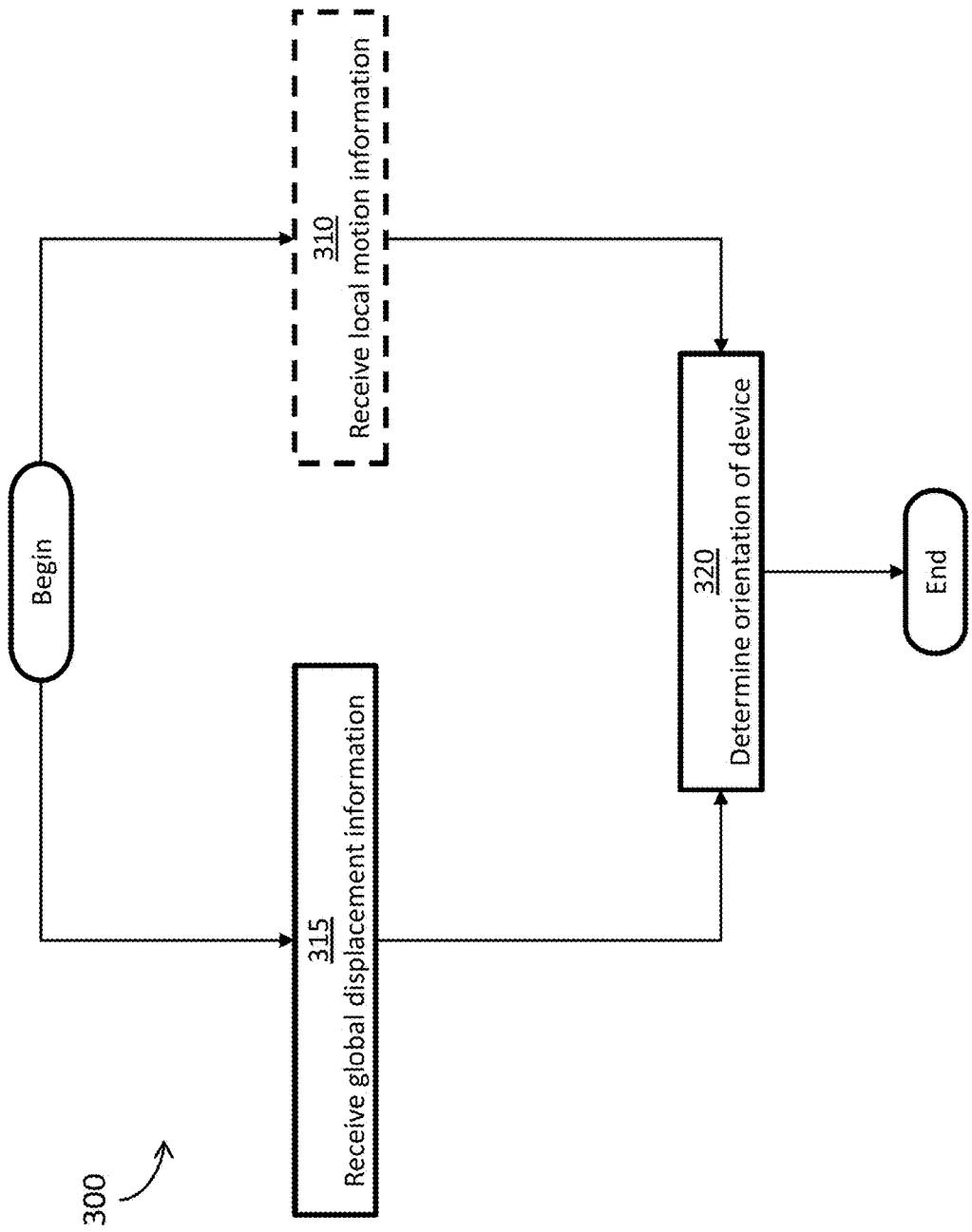
FIG. 14 is a flow chart depicting a representative process for determining the orientation of a mobile device with respect to a vehicle, in accordance with some embodiments.

FIG. 14 depicts a representative high-level process 300 for estimating the orientation of a mobile device (e.g., mobile device 110) with respect to a vehicle (e.g., vehicle 101). The acts comprising representative process 300 are described in detail in the paragraphs that follow.

In some embodiments, representative process 300 optionally may begin at act 310, wherein local motion information regarding the mobile device may be received by the processor(s) discussed above. Before, during, or after act 310, act 315 may occur, wherein global displacement information regarding the mobile device may be received by the processor(s). In some embodiments, acts 310 and/or 315 may be similar to acts 210 and 215 described above.

Representative process 300 may then proceed to act 320, wherein based on the global displacement information and optionally the local motion information regarding the mobile device, the orientation of the mobile device with respect to the vehicle may be determined by the processor(s) in use. In some embodiments, act 320 may be similar to act 220 described above.

In some embodiments, process 300 may then end or repeat as necessary.

Figure 15:
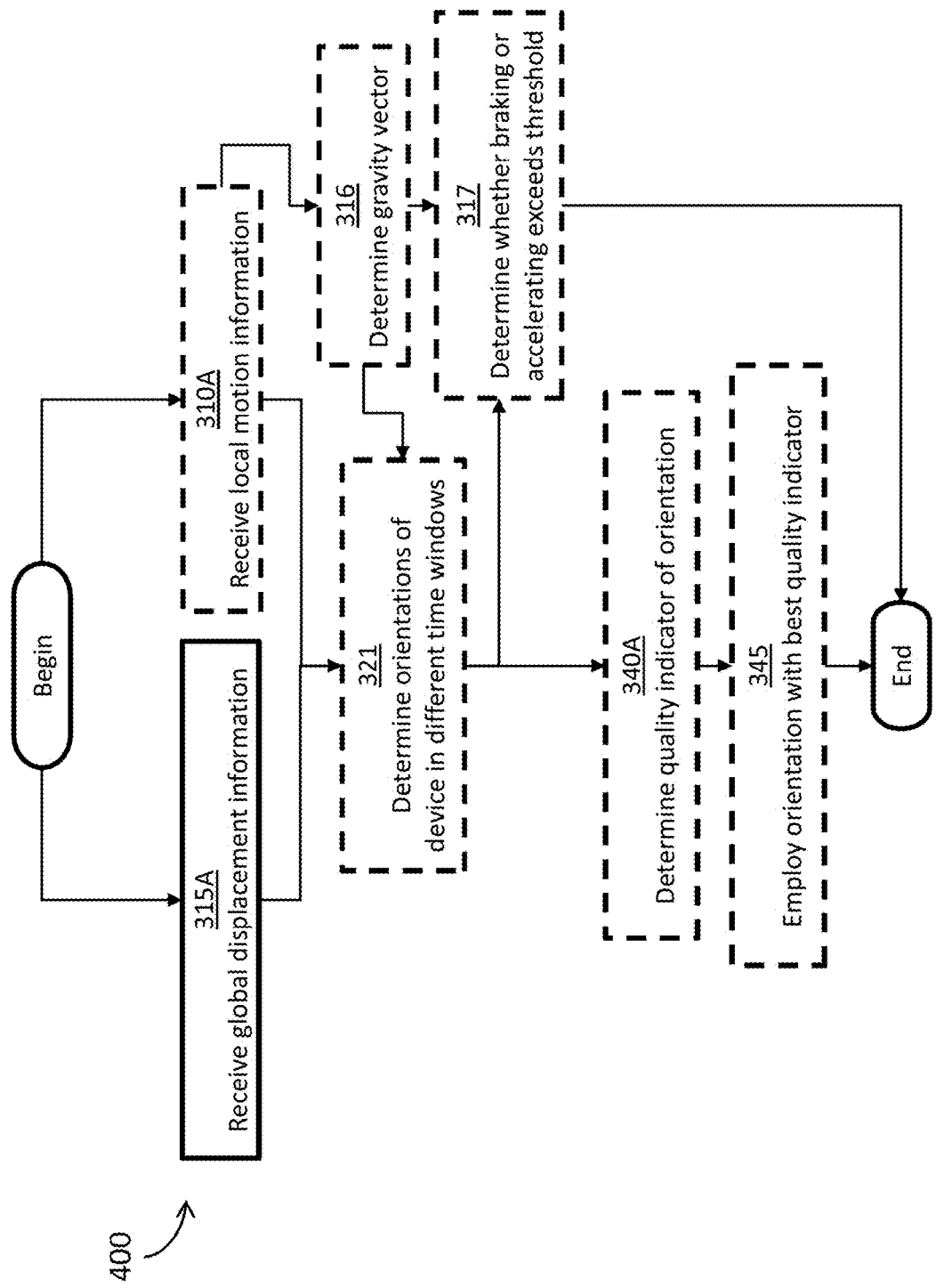
FIG. 15 is a flow chart depicting a representative process for determining orientations of a mobile device with respect to a vehicle in different time windows, determining a quality indicator for each orientation, and determining hard braking or acceleration, in accordance with some embodiments.

FIG. 15 depicts a representative high-level process 400 for determining orientations of a mobile device (e.g., mobile device 110) with respect to a vehicle (e.g., vehicle 101) in different time windows, determining a quality indicator for each orientation, and determining hard braking or acceleration. The acts comprising representative process 400 are described in detail in the paragraphs that follow.

In some embodiments, representative process 400 optionally may begin at act 310A, wherein local motion information regarding the mobile device may be received by the processor(s) discussed above. Before, during, or after act 310A, act 315A may occur, wherein global displacement information regarding the mobile device may be received by the processor(s). In some embodiments, acts 310A and/or 315A may repeat as needed to receive the desired or needed amount of information in different time windows. A more detailed discussion of time windows follows below.

In some embodiments, information of one or more specific time windows may be observed and/or extracted by a sensor or other source module (e.g., an accelerometer) and received by the processor(s) in use. Extraction of information in one or more windows may be performed in any suitable way. For example, in some embodiments, a subset of the information may be discarded, such as to account for initial setup and/or tear-down of the mobile device in or near the vehicle. In some embodiments, any non-discarded data may be divided into information captured during five second windows, with a 2.5 second overlap between windows. In this respect, the Assignee has appreciated that longer sampling windows may provide greater resolution of resulting representations of the sampled data, which may further improve the reliability and accuracy of the determinations herein. Of course, any suitable sampling window and/or overlap between windows may be used. Moreover, the sampling window and overlap between windows may be fixed or variable. Embodiments are not limited in this respect.

Extraction of information may also involve interpolating information in each sampling window on to a regularly sampled time grid. This may be accomplished in any suitable fashion, such as via linear interpolation. The result may be information describing acceleration in the x, y, and z directions, such as is shown in the graphs shown at the top of each of FIGS. 16 and 17. These graphs are described in further detail below.

Figure 16:
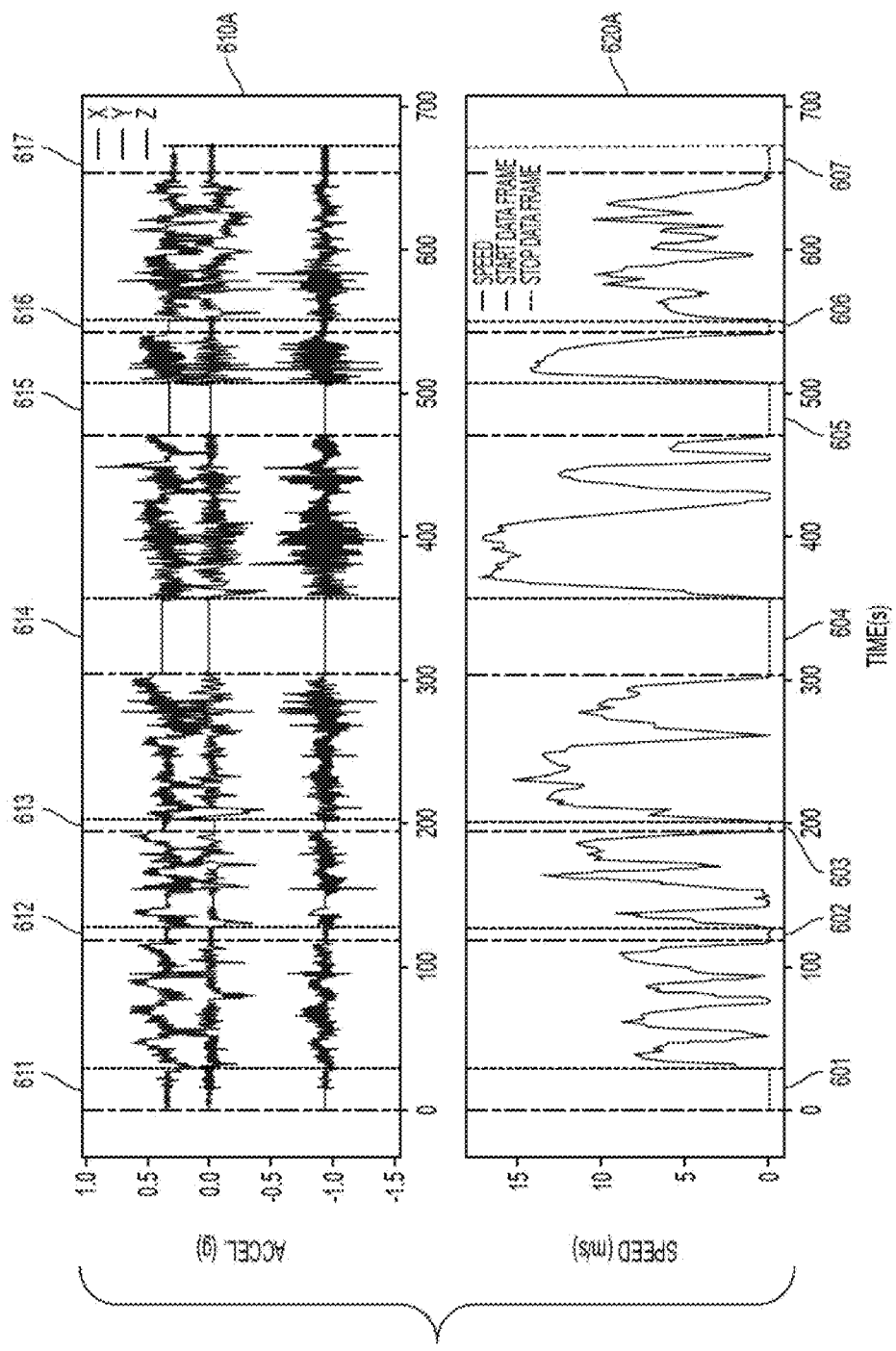
FIGS. 16-17 depict representations of acceleration data captured during trips in vehicles, in accordance with some embodiments.
Figure 17:
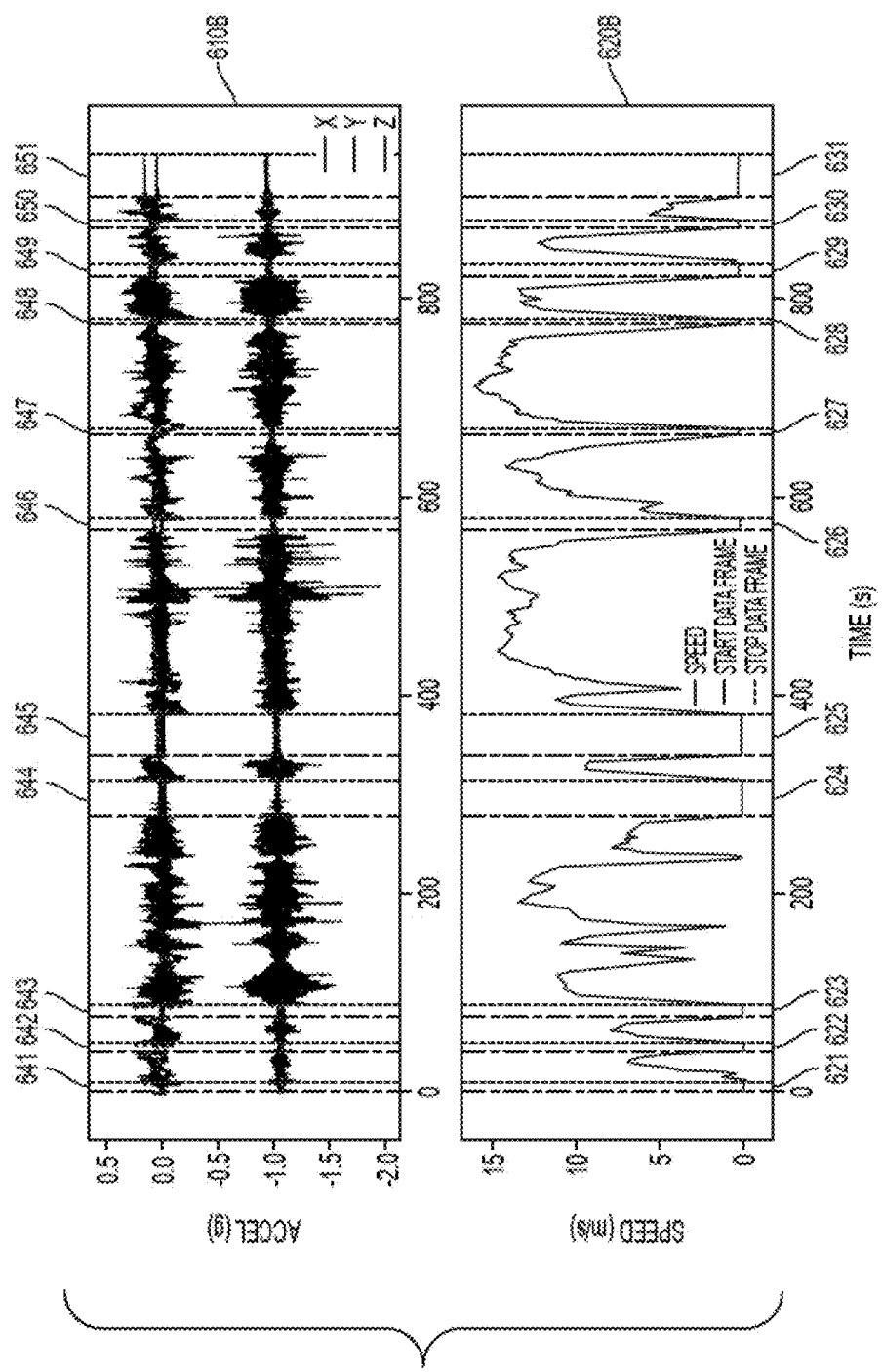

FIGS. 16 and 17 each depict acceleration data (i.e., acceleration components in the x-, y-, and z-directions) captured by an accelerometer of a mobile device over a particular time interval (any of which could be a time window in some embodiments) in portions 610A and 610B, and speed data inferred from location information captured by a GPS unit of the mobile device over the same time interval in portions 620A and 620B. It can be seen in portions 620A and 620B that during certain time intervals, the corresponding mobile device is not moving (i.e., its speed is 0 m/s). Specifically, in FIG. 16, time intervals when the corresponding mobile device is not moving are labeled 601, 602, 603, 604, 605, 606, and 607. Acceleration data during these same time intervals are labeled 611, 612, 613, 614, 615, 616, and 617. Similarly, in FIG. 17, the time intervals when the corresponding mobile device is not moving are labeled 621, 622, 623, 624, 625, 626, 627, 628, 629, 630, and 631. The acceleration data during these same time intervals are labeled 641, 642, 643, 644, 645, 646, 647, 648, 649, 650, and 651. The Assignee has appreciated that identifying such time intervals during which the mobile device is not moving according to both local motion information (e.g., acceleration of a mobile device) and global displacement information (e.g., speed of the mobile device) may provide bases for synchronization of the two sets of information. For example, such time intervals may suggest the intervals correspond to the same actual time interval.

Referring again to FIG. 15, representative process 400 may then optionally proceed to act 321, wherein based on the local motion information and the global displacement information, each of which may be a collection of information from different time intervals, any number of orientations of the mobile device with respect to the vehicle may be determined by the processor(s), such as one for each of the different time windows in which the local motion information and the global displacement information was received. For example, the processor(s) may, during a time window different from a time window of an already determined orientation of the mobile device with respect to the vehicle, determine an additional orientation. In some embodiments, part of the determination(s) of act 321 may include act 316. Alternatively, these determination(s) in act 321 may be based on the gravity vector determined in act 316. For example, act 316's determination of the gravity vector may be an integral part of determining the orientation(s) in act 321, or the orientation(s) may be determined in act 321 based on an already determined gravity vector from act 316. In some embodiments, representative process 400 may optionally proceed from act 310A to act 316, which may be similar to act 216 described above.

In some embodiments, act 321 may include synchronization of the global displacement information and the local motion information, such as alignment of the respective time axes of the global displacement information and the local motion information. This synchronization may include detection of time intervals in each that suggest the intervals correspond to the same actual time interval. For example, the processor(s) may detect time intervals in each that indicate speed and acceleration that would correspond with each other and both result from a particular behavior of a mobile device, such as either constant speed or negligible speed corresponding to negligible acceleration. The processor(s) may synchronize the global displacement information and the local motion information based entirely on these time intervals, or the processor(s) may use these time intervals as a starting point to then compare the time intervals in between them to fine tune the synchronization (which may increase the accuracy and/or the confidence level in the synchronization). According to some embodiments, successfully synchronizing local motion information and global displacement information as described above may produce results such as are shown in the relative alignments of 610A with 620A and 610B with 620B in FIGS. 16 and 17, respectively.

Representative process 400 may then optionally proceed to act 317, wherein a determination may be made by the processor(s) regarding whether an acceleration of the mobile device indicates braking or accelerating that exceeds a threshold (e.g., because "hard" braking or acceleration of the vehicle has occurred). In some embodiments, act 317 may be similar to act 217 described above. For example, the determination of act 317 may be based directly on the determination of the gravity vector in act 316. Alternatively, the determination of act 317 may be based indirectly on the determination of the gravity vector in act 316, and based directly on the determination of the orientation(s) in act 321.

In some embodiments, such as where the determination of act 317 is based on the determination of the orientation(s) in act 321, the processor(s) may determine whether an acceleration of the mobile device indicates braking or accelerating that exceeds a threshold in each time window. Alternatively, some but not all time windows are considered in act 317. In other embodiments, the processor(s) may determine whether an acceleration of the mobile device indicates braking or accelerating that exceeds a threshold in a single given time window at a time.

Alternatively, representative process 400 may then optionally proceed to act 340A, wherein at least one quality indicator indicating a degree of reliability of the determined orientation(s) of the mobile device with respect to the vehicle may be determined by the processor(s), such as for each time window described above or for each determined orientation. For example, when the quality indicator for a given determined orientation lies below a given threshold, that orientation determination and/or the corresponding time window may be deemed untrustworthy and can be ignored.

Representative process 400 may then optionally proceed to act 345, wherein the processor(s) may employ the best orientation as the orientation to use. For example, if two orientations have been determined in two different time windows or even in the same time window (e.g., using different information), the determined orientation corresponding with the most positive quality indicator may be employed as the orientation and/or for further determinations. That is, in some embodiments the processor(s) may perform a comparison between the quality indicators and employ the determined orientation with the most positive quality indicator. In some embodiments, employing a given orientation for a given time window includes using the employed orientation to calculate orientations at other time windows. For example, if the quality indicator for a first determined orientation at 2 seconds is better than the quality indicator for a second determined orientation at 5 seconds, the processor(s) may employ the first determined orientation and re-determine the orientation at 5 seconds using the first determined orientation and any available information indicating if and how the mobile device changed its orientation with respect to the vehicle in the intervening time.

In some embodiments, process 400 may then end or repeat as necessary.

Figure 18:
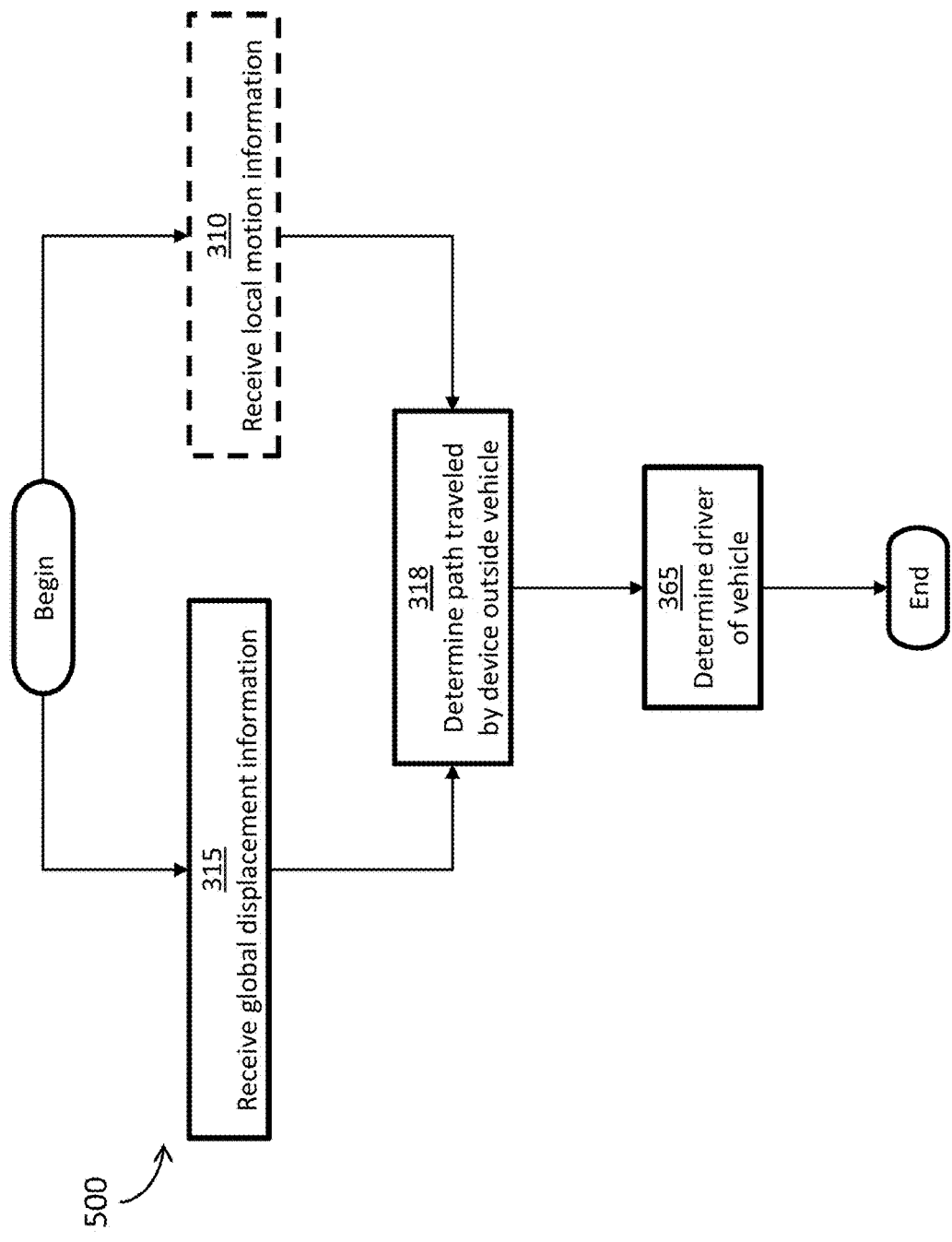
FIG. 18 is a flow chart depicting a representative process for determining the driver of a vehicle, in accordance with some embodiments.

FIG. 18 depicts a representative high-level process 500 for determining whether the user of the device is the driver of a vehicle (e.g., vehicle 101). The acts comprising representative process 500 are described in detail in the paragraphs that follow.

In some embodiments, representative process 500 optionally may begin at act 310, wherein local motion information regarding the mobile device may be received by the processor(s) discussed above. Before, during, or after act 310, act 315 may occur, wherein global displacement information regarding the mobile device may be received by the processor(s). In some embodiments, acts 310 and/or 315 may be similar to acts 210 and 215 described above.

Representative process 500 may then proceed to act 318, wherein based on the global displacement information and optionally the local motion information regarding the mobile device, a path traveled by the mobile device with respect to the vehicle (for example, transported outside the vehicle by a user of the mobile device) may be determined by the processor(s) in use. Some examples of paths are shown in FIG. 12, as discussed above.

Representative process 500 may then proceed to act 365, wherein based on the determined path traveled by the mobile device with respect to the vehicle as the mobile device is transported by the user outside the vehicle, the processor(s) determine whether the user of the mobile device is the driver of the vehicle. In some embodiments, act 365 may be similar to act 265 described above.

In some embodiments, process 500 may then end or repeat as necessary.

Figure 19:
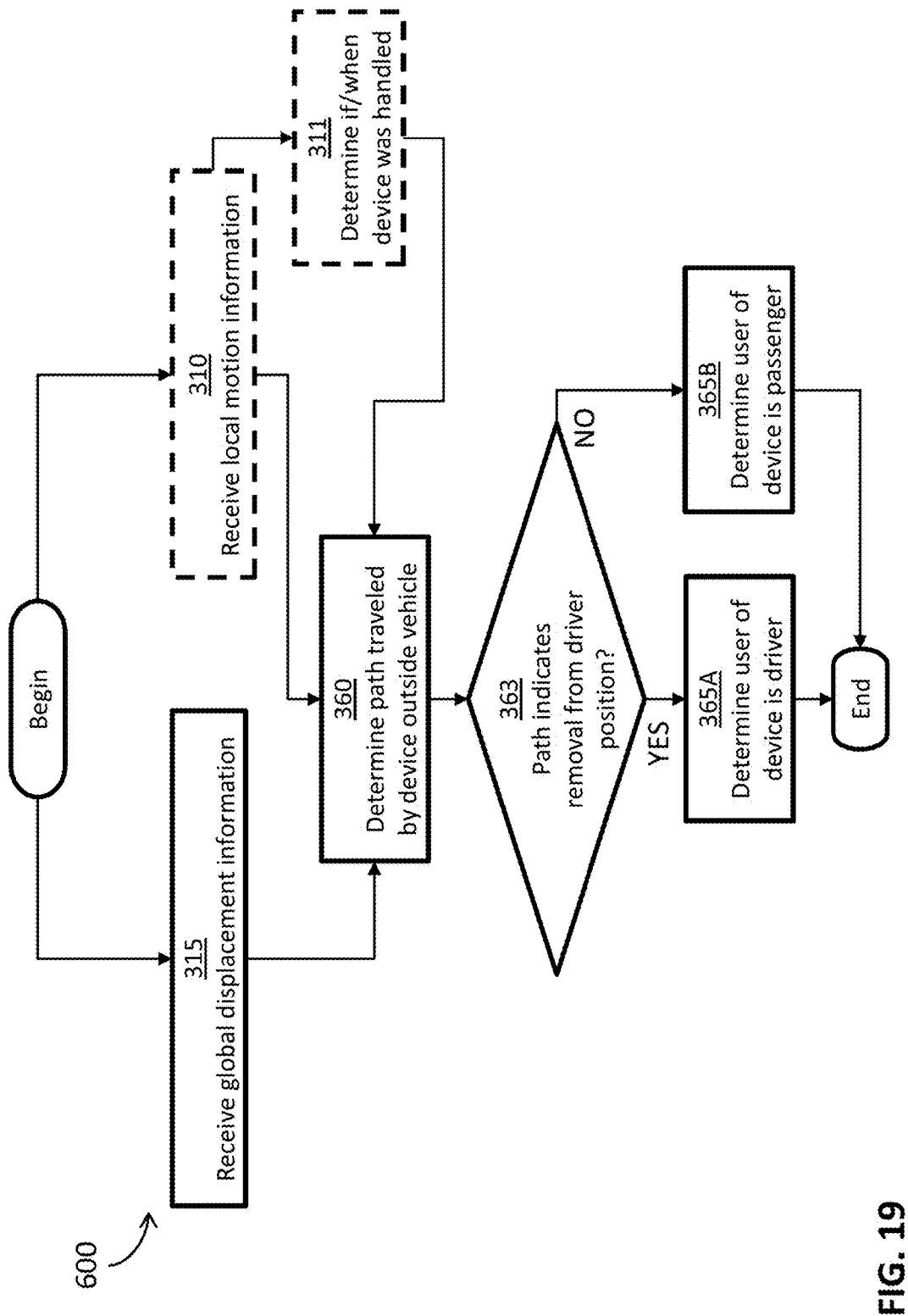
FIG. 19 is a flow chart depicting a representative process for determining whether a user is a driver or passenger of a vehicle, in accordance with some embodiments.

FIG. 19 depicts a representative high-level process 600 for determining whether a user is a driver or passenger of a vehicle (e.g., vehicle 101). The acts comprising representative process 600 are described in detail in the paragraphs that follow.

In some embodiments, representative process 600 optionally may begin at act 310, wherein local motion information regarding the mobile device may be received by the processor(s) discussed above. Before, during, or after act 310, act 315 may occur, wherein global displacement information regarding the mobile device may be received by the processor(s). In some embodiments, acts 310 and/or 315 may be similar to acts 210 and/or 215 described above, respectively.

Figure 20:
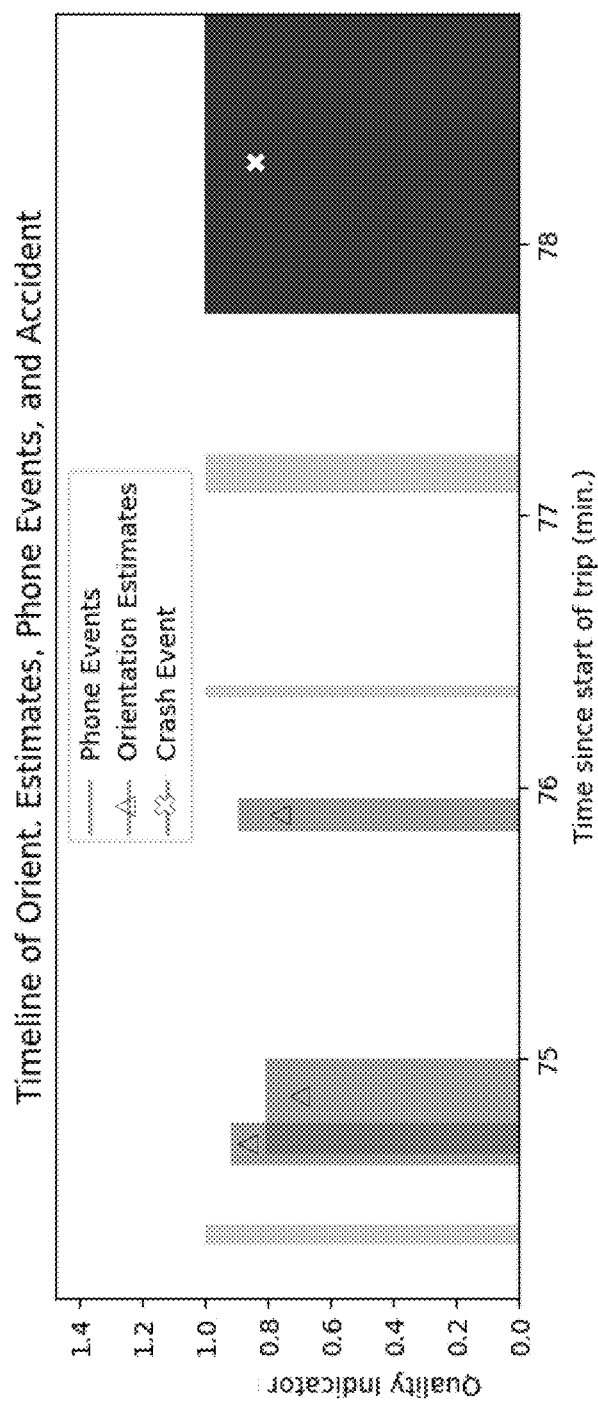
FIG. 20 depicts a representation of a timeline of events, in accordance with some embodiments.

Representative process 600 may then optionally proceed to act 311, wherein the processor(s) determines if and when the mobile device was handled by anyone, such as the user of the mobile device. In some embodiments, the processor(s) may determine whether the mobile device has been handled within a time interval before the path and/or an orientation of the mobile device with respect to the vehicle is determined. The Assignee has appreciated that handling of the mobile device can make determination of orientation very difficult, and that determining whether a mobile device has been handled can significantly increase the reliability and accuracy of orientation determination, especially if it can be determined with confidence (e.g., 70-80% confidence) that the mobile device was not handled in certain times near when an orientation is determined. For example, if the mobile device was handled between an orientation event and an impact, the last orientation event in the list may not be reliably used as initial orientation at impact. FIG. 20 shows an exemplary timeline of orientation estimate events, mobile device/phone events, and an impact/crash event, with corresponding quality indicators for the orientation estimate events. The Assignee has appreciated that although the orientation estimates can be propagated through each of the two mobile device usage events shown to obtain an estimate of the orientation at the start of the accident, the 10 Hz frequency at which the gyroscope data is typically available may provide insufficient resolution to track orientation through period of handling and/or usage of the mobile device. The Assignee has further appreciated that this issue may be avoided or mitigated by reporting integrated gyroscope measurements at 10 Hz rather than the raw gyroscope data at 10 Hz.

Representative process 600 may then proceed to act 360, wherein based on the global displacement information and optionally the local motion information regarding the mobile device, a path traveled by the mobile device with respect to the vehicle (e.g., transported outside the vehicle by a user of the mobile device) may be determined by the processor(s) in use. In some embodiments, act 360 may be similar to act 260 described above. Alternatively or additionally, the processor(s) may have access to an orientation of the mobile device determined with respect to the vehicle and may determine the path traveled by the mobile device based at least in part on that determined orientation.

Representative process 600 may then proceed to act 363, wherein the processor(s) may determine whether the path determined in act 360 indicates removal from a driver position of the vehicle. If a yes is determined in act 360, representative process 600 may then proceed to act 365A, wherein the processor(s) may determine that the user of the mobile device is the driver of the vehicle.

Alternatively, if a no is determined in act 365B, representative process 600 may then proceed to act 365B, wherein the processor(s) may determine that the user of the mobile device is a passenger of the vehicle.

In some embodiments, process 600 may then end or repeat as necessary.

Figure 21:
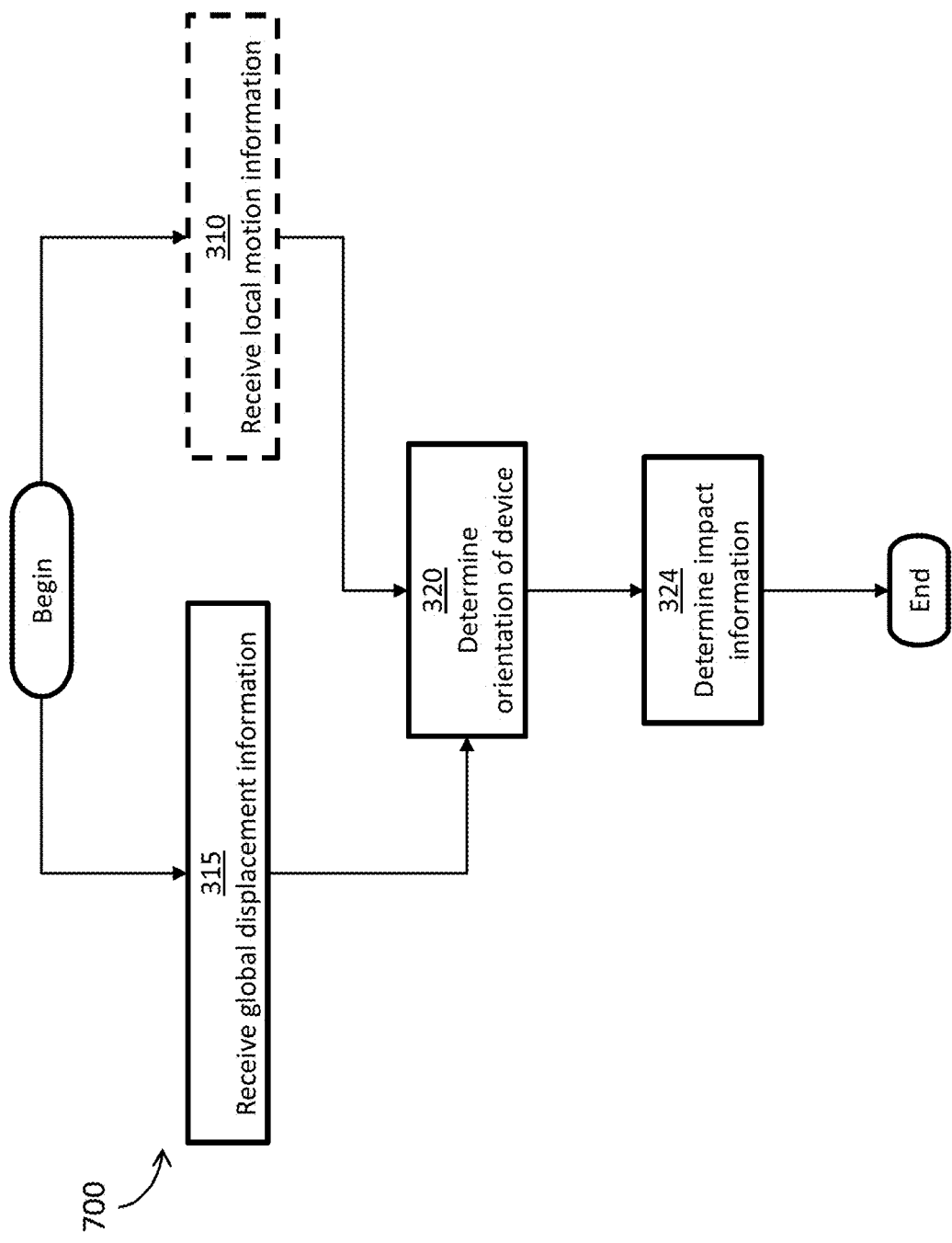
FIG. 21 is a flow chart depicting a representative process for determining information regarding an impact a vehicle has sustained, in accordance with some embodiments.

FIG. 21 depicts a representative high-level process 500 for determining information regarding an impact a vehicle (e.g., vehicle 101) has sustained. The acts comprising representative process 700 are described in detail in the paragraphs that follow.

In some embodiments, representative process 700 optionally may begin at act 310, wherein local motion information regarding the mobile device may be received by the processor(s) discussed above. Before, during, or after act 310, act 315 may occur, wherein global displacement information regarding the mobile device may be received by the processor(s). In some embodiments, acts 310 and/or 315 may be similar to acts 210 and 215 described above.

Representative process 700 may then proceed to act 320, wherein based on the global displacement information and optionally the local motion information regarding the mobile device, the orientation of the mobile device with respect to the vehicle may be determined by the processor(s) in use. In some embodiments, act 320 may be similar to act 220 described above.

Representative process 700 may then proceed to act 324, wherein based on the determined orientation, the processor(s) may determine impact information, such as information about an impact the vehicle has sustained. For example, the processor(s) may determine the direction (examples of which are shown in FIG. 13) and/or area of impact, as discussed above.

In some embodiments, process 700 may then end or repeat as necessary.

Figure 22:
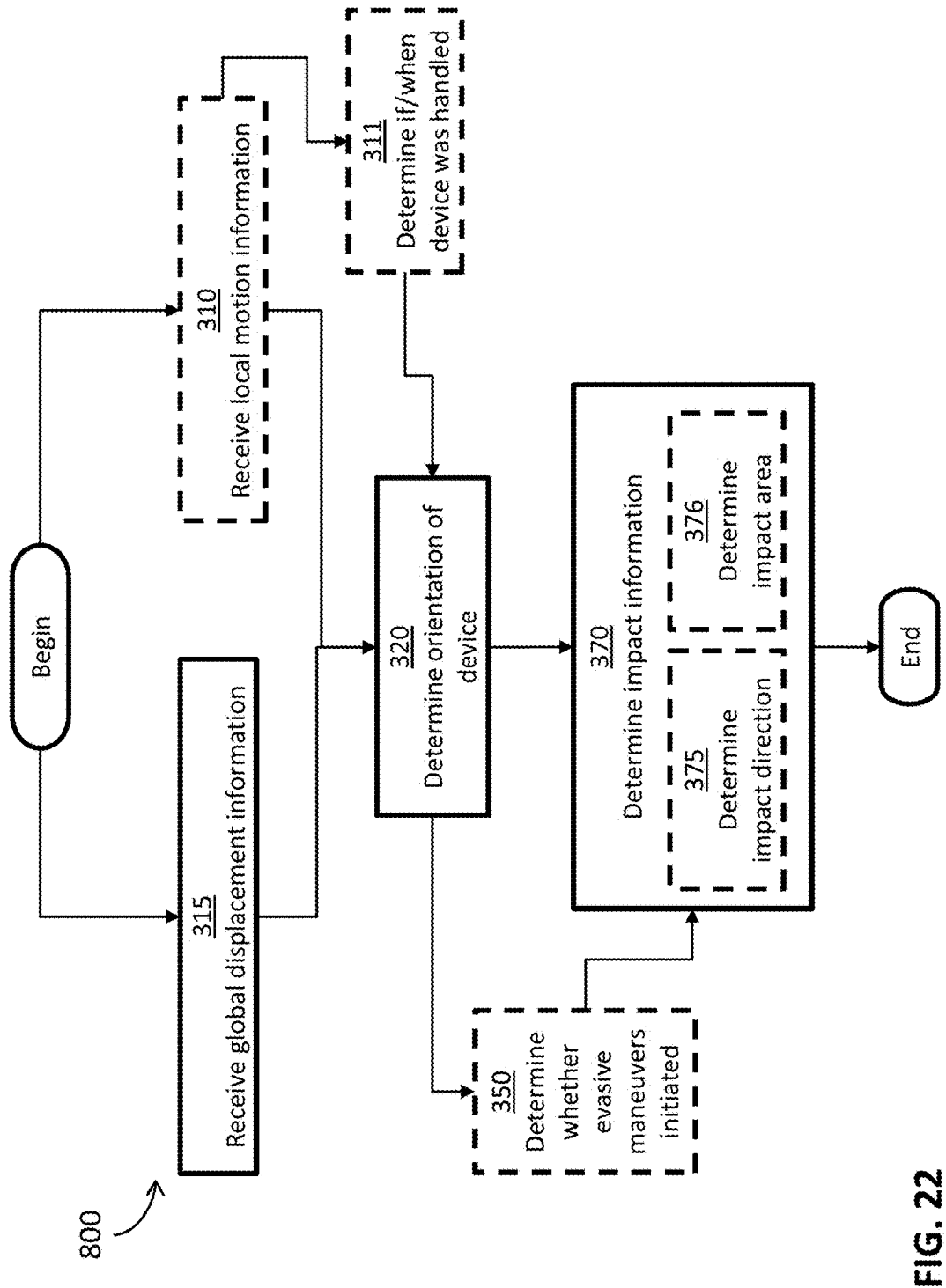
FIG. 22 is a flow chart depicting a representative process for determining information regarding an impact a vehicle has sustained and whether evasive maneuvers were initiated, in accordance with some embodiments.

FIG. 22 depicts a representative high-level process 800 for determining information regarding an impact a vehicle (e.g., vehicle 101) has sustained and whether evasive maneuvers (e.g., swerving, braking, etc.) were initiated. The acts comprising representative process 800 are described in detail in the paragraphs that follow.

In some embodiments, representative process 800 optionally may begin at act 310, wherein local motion information regarding the mobile device may be received by the processor(s) discussed above. Before, during, or after act 310, act 315 may occur, wherein global displacement information regarding the mobile device may be received by the processor(s). In some embodiments, acts 310 and/or 315 may be similar to acts 210 and 215 described above.

Representative process 800 may then optionally proceed to act 311, wherein the processor(s) determines if and when the mobile device was handled by anyone, such as the user of the mobile device. In some embodiments, the processor(s) may determine whether the mobile device has been handled within a time interval before an impact and/or an orientation of the mobile device with respect to the vehicle is determined.

Representative process 800 may then proceed to act 320, wherein based on the global displacement information and optionally the local motion information (and/or based on any determination about handling of the mobile device made in act 311) regarding the mobile device, the orientation of the mobile device with respect to the vehicle may be determined by the processor(s) in use. In some embodiments, act 320 may be similar to act 220 described above.

Representative process 800 may proceed to act 350, wherein the processor(s) may, based on the determined orientation of the mobile device with respect to the vehicle, determine whether a driver of the vehicle initiated one or more evasive maneuvers. In some embodiments, the evasive maneuvers may have been made before an impact the vehicle sustained or in any other suitable time or situation. For example, the driver of the vehicle may have swerved the vehicle to avoid the impact, such as just before the impact. The Assignee has appreciated that evidence of evasive maneuvers may be useful for purposes of determining civil or criminal liability, insurance investigation, and/or any other suitable reason.

Alternatively or additionally, representative process 800 may then proceed to act 370, wherein based on the determined orientation, the processor(s) may determine impact information, such as information about an impact the vehicle has sustained. In some embodiments, act 370 may include act 375, wherein the information being determined comprises a direction of the impact. Alternatively or additionally, act 370 may include act 376, wherein the information being determined comprises an area of the impact.

In some embodiments, process 800 may then end or repeat as necessary.

III. Implementation Detail

In some embodiments, other vehicle operation data may be received in numerous forms. As one example, this data may relate to an individual's behavior in operating the vehicle, such as what may be captured by the accelerometer, gyroscope, and/or GPS unit of the mobile device. Of course, the other data captured need not be captured by components of the mobile device, and may be captured by any suitable component(s), whether internal or external to the vehicle. One representative use for such vehicle operation data is by an insurer that underwrites a UBI policy on the vehicle. However, any of numerous other uses are possible. As one example, the manager of a team of salespeople each assigned to one of a fleet of vehicles may find data relating to each salesperson's operation of his/her assigned vehicle useful for training purposes. As another example, behavioral data relating to one or more operators, organizations, circumstances, time periods, etc., may be aggregated for analysis.

It should be appreciated that although the embodiments described above relate to estimating the orientation of a mobile device with respect to a vehicle using global displacement information and local motion information typically captured by a mobile device (or derivations or representations thereof), embodiments are not limited to employing specific information that relates to acceleration, speed, heading, or location, or to using information captured by a mobile device, to do so. Any suitable information, captured by any suitable device(s), may be used.

It should also be appreciated that, in some embodiments, the methods described above with reference to FIGS. 11, 14, 15, 18, 19, 21, and 22 may vary, in any of numerous ways. For example, in some embodiments, the steps of the methods described above may be performed in a different sequence than that which is described, a method may involve additional steps not described above, and/or a method may not involve all of the steps described above.

Figure 23:
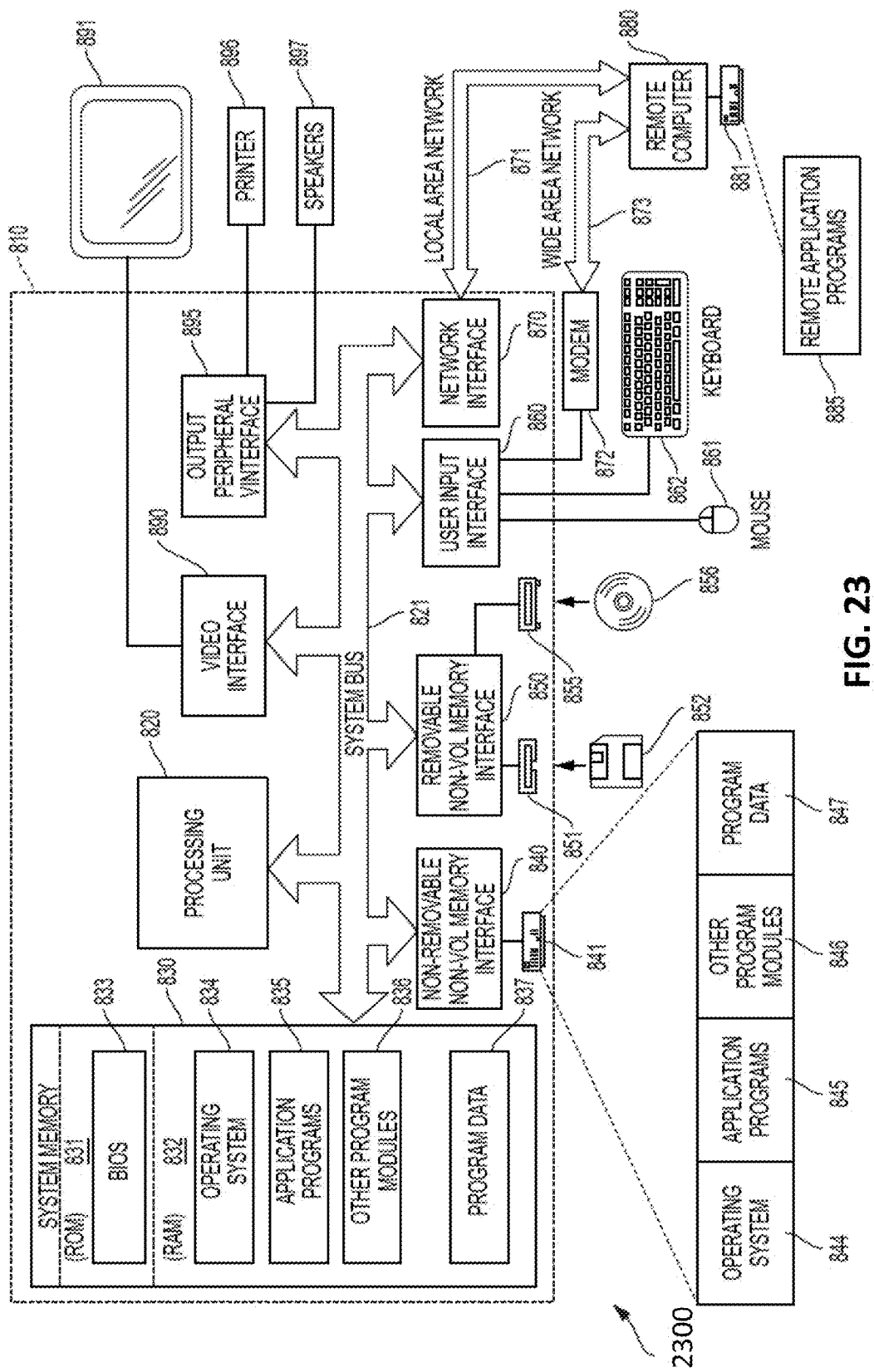
FIG. 23 is a block diagram depicting a representative computing system that may be used to implement certain aspects.

It should further be appreciated from the foregoing description that some aspects may be implemented using a computing device. FIG. 23 depicts a general purpose computing device in system 2300, in the form of a computer 810, which may be used to implement certain aspects. For example, computer 810, or components thereof, may constitute the mobile device 110 or server 130, or components thereof.

In computer 810, components include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media that may be used to store the desired information and may be accessed by computer 810. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 23 illustrates operating system 834, application programs 835, other program modules 839 and program data 837.

The computer 810 may also include other removable/non-removable, volatile/nonvolatile computer storage media. By way of example only, FIG. 23 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 859 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 23, provide storage of computer readable instructions, data structures, program modules and other data for the computer 810. In FIG. 23, for example, hard disk drive 841 is illustrated as storing operating system 844, application programs 845, other program modules 849, and program data 847. Note that these components can either be the same as or different from operating system 834, application programs 835, other program modules 539, and program data 837. Operating system 844, application programs 845, other program modules 849, and program data 847 are given different numbers here to illustrate that, at a minimum, they are different copies. A user may enter commands and information into the computer 810 through input devices such as a keyboard 892 and pointing device 891, commonly referred to as a mouse, trackball or touch pad. Other input devices (not shown) may include a microphone, joystick, game pad, satellite dish, scanner, or the like. These and other input devices are often connected to the processing unit 820 through a user input interface 590 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 899, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 23. The logical connections depicted in FIG. 23 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 890, or other appropriate mechanism. In a networked environment, program modules depicted relative to the computer 810, or portions thereof, may be stored in the remote memory storage device. By way of example, and not limitation, FIG. 23 illustrates remote application programs 885 as residing on memory device 881. It will be appreciated that the network connections shown are exemplary and other means of establishing a communications link between the computers may be used.

Embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, some embodiments may be embodied as a computer readable medium other than a computer-readable storage medium. Examples of computer readable media that are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope. Further, though advantages of the present invention are indicated, it should be appreciated that not every embodiment will include every described advantage. Some embodiments may not implement any features described as advantageous herein. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for determining an orientation of a mobile device with respect to a vehicle, the system comprising:
at least one computer processor programmed to:
receive local motion information regarding the mobile device, the local motion information regarding the mobile device comprising information indicating non-linear acceleration of the mobile device;
receive global displacement information regarding the mobile device; and
based on the local motion information regarding the mobile device and the global displacement information regarding the mobile device, determine the orientation of the mobile device with respect to the vehicle.

2. The system of claim 1, wherein the at least one computer processor is programmed to determine a gravity vector based on the local motion information and the global displacement information.

3. The system of claim 2, wherein the at least one computer processor is programmed to, based on the determined gravity vector, determine whether an acceleration of the mobile device indicates braking or accelerating that exceeds a threshold.

4. The system of claim 1, wherein the at least one computer processor is programmed to determine at least one quality indicator indicating a degree of reliability of the determined orientation of the mobile device with respect to the vehicle.

5. The system of claim 4, wherein the at least one computer processor is programmed to determine an additional orientation of the mobile device with respect to the vehicle during a time window different from a time window of the determined orientation of the mobile device with respect to the vehicle, and determine whether to employ the orientation or the additional orientation based on a comparison between the at least one quality indicator and an additional quality indicator for the additional orientation.

6. The system of claim 1, wherein the global displacement information comprises at least one of:
at least one speed of the mobile device;
at least one heading of the mobile device; and
at least two positions determined by a global positioning system component of the mobile device.

7. The system of claim 1, wherein the at least one computer processor is programmed to:
based at least in part on the determined orientation of the mobile device with respect to the vehicle, determine a path traveled by the mobile device with respect to the vehicle as the mobile device is transported by a user outside the vehicle; and
based on the determined path traveled by the mobile device with respect to the vehicle as the mobile device is transported by the user outside the vehicle, determine whether the user of the mobile device is a driver of the vehicle.

8. The system of claim 1, wherein the at least one computer processor is programmed to, based on the determined orientation of the mobile device with respect to the vehicle, determine whether a driver of the vehicle initiated one or more evasive maneuvers before an impact the vehicle sustained.

9. The system of claim 1, wherein the at least one computer processor is programmed to, based on the determined orientation of the mobile device with respect to the vehicle, determine information regarding an impact the vehicle has sustained, the information comprising a direction and/or an area of the impact.

10. At least one computer-readable storage medium having instructions recorded thereon which, when executed by a computer, cause the computer to perform a method for determining an orientation of a mobile device with respect to a vehicle, the method comprising:
receiving local motion information regarding the mobile device, the local motion information regarding the mobile device comprising information indicating non-linear acceleration of the mobile device;
receiving global displacement information regarding the mobile device; and
based on the local motion information regarding the mobile device and the global displacement information regarding the mobile device, determining the orientation of the mobile device with respect to the vehicle.

11. The at least one computer-readable storage medium of claim 10, wherein the method comprises estimating a gravity vector based on the local motion information and the global displacement information.

12. The at least one computer-readable storage medium of claim 11, wherein the method comprises, based on the determined gravity vector, determining whether an acceleration of the mobile device indicates braking or accelerating that exceeds a threshold.

13. The at least one computer-readable storage medium of claim 10, wherein the method comprises determining at least one quality indicator indicating a degree of reliability of the determined orientation of the mobile device with respect to the vehicle.

14. The at least one computer-readable storage medium of claim 10, wherein the method comprises, based on the determined orientation of the mobile device with respect to the vehicle, determining whether a driver of the vehicle initiated one or more evasive maneuvers before an impact the vehicle sustained.

15. A method for determining an orientation of a mobile device with respect to a vehicle, the method comprising:
receiving local motion information regarding the mobile device, the local motion information regarding the mobile device comprising information indicating non-linear acceleration of the mobile device;
receiving global displacement information regarding the mobile device; and
based on the local motion information regarding the mobile device and the global displacement information regarding the mobile device, determining the orientation of the mobile device with respect to the vehicle.

16. The method of claim 15, wherein the method comprises estimating a gravity vector based on the local motion information and the global displacement information.

17. The method of claim 15, wherein the method comprises, based on the determined orientation of the mobile device with respect to the vehicle, determining whether a driver of the vehicle initiated one or more evasive maneuvers before an impact the vehicle sustained.

* * * * *